US012145575B2

(12) United States Patent
Wang et al.

(10) Patent No.: US 12,145,575 B2
(45) Date of Patent: Nov. 19, 2024

(54) SELECTION OF A PARKING SPACE USING A PROBABILISTIC APPROACH

(71) Applicant: Aptiv Technologies AG, Schaffhausen (CH)

(72) Inventors: Qian Wang, Westfield, IN (US); Guoguang Zhang, Kokomo, IN (US)

(73) Assignee: Aptiv Technologies AG, Schaffhausen (CH)

( * ) Notice: Subject to any disclaimer, the term of this patent is extended or adjusted under 35 U.S.C. 154(b) by 310 days.

(21) Appl. No.: 17/655,221

(22) Filed: Mar. 17, 2022

(65) Prior Publication Data

US 2023/0192070 A1     Jun. 22, 2023

Related U.S. Application Data

(60) Provisional application No. 63/265,925, filed on Dec. 22, 2021, provisional application No. 63/265,926, filed on Dec. 22, 2021.

(51) Int. Cl.
    *B60W 30/06*            (2006.01)

(52) U.S. Cl.
    CPC ....... *B60W 30/06* (2013.01); *B60W 2420/403* (2013.01); *B60W 2420/408* (2024.01);
(Continued)

(58) Field of Classification Search
    CPC ............. B60W 30/06; B60W 2552/00; B60W 60/001; B62D 15/0285; G08G 1/168
See application file for complete search history.

(56) References Cited

U.S. PATENT DOCUMENTS

| 8,914,173 B2 | 12/2014 | Biondo et al. |
| 9,522,675 B1 | 12/2016 | You et al. |
(Continued)

FOREIGN PATENT DOCUMENTS

| CN | 113284359 A | 8/2021 |
| CN | 115257712 A | 11/2022 |

OTHER PUBLICATIONS

"Extended European Search Report", EP Application No. 23158945.8, Aug. 29, 2023, 10 pages.
(Continued)

*Primary Examiner* — Jelani A Smith
*Assistant Examiner* — Toya Pettiegrew
(74) *Attorney, Agent, or Firm* — Harness, Dickey & Pierce, P.L.C.

(57) ABSTRACT

This document describes techniques and systems for selecting a parking space using a probabilistic approach. An example system includes a processor that can determine whether multiple parking spaces are available in proximity to a host vehicle using sensor data. Parking-space characteristics (e.g., a width, entry turning radius, and longitudinal distance to the parking space) of each available parking space are determined using the sensor data. The processor can then choose a selected parking space among the multiple parking spaces based on the parking-space characteristics. The processor or another processor can then control the host vehicle to park in the selected parking space using an assisted-driving or autonomous-driving system. In this way, the described system can select and navigate to a parking space using a probabilistic approach. The processor can choose the parking space and parking maneuver based on programmable and customizable parking-space characteristics in some implementations.

17 Claims, 13 Drawing Sheets

(52) U.S. Cl.
CPC ..... *B60W 2420/54* (2013.01); *B60W 2552/00* (2020.02); *B60W 2555/20* (2020.02)

(56) References Cited

U.S. PATENT DOCUMENTS

| | | | |
|---|---|---|---|
| 9,738,287 | B2 | 8/2017 | Bolger et al. |
| 9,914,462 | B2 | 3/2018 | Porras et al. |
| 10,870,368 | B2 | 12/2020 | Ing et al. |
| 10,957,198 | B1 | 3/2021 | Hao |
| 2008/0028055 | A1 | 1/2008 | Dolev et al. |
| 2009/0085771 | A1* | 4/2009 | Wu .................. B62D 15/0285 348/148 |
| 2014/0340242 | A1 | 11/2014 | Belzner et al. |
| 2017/0026723 | A1 | 1/2017 | Wan et al. |
| 2017/0101030 | A1 | 4/2017 | Hughes et al. |
| 2017/0267233 | A1 | 9/2017 | Minster et al. |
| 2018/0072181 | A1 | 3/2018 | Christen et al. |
| 2018/0215375 | A1* | 8/2018 | Greene ............... G08G 1/168 |
| 2018/0345955 | A1* | 12/2018 | Kim .................. B62D 15/0285 |
| 2018/0354502 | A1 | 12/2018 | Yaldo et al. |
| 2019/0333385 | A1 | 10/2019 | Wisbrun |
| 2020/0258385 | A1 | 8/2020 | Mahajan |
| 2022/0097636 | A1 | 3/2022 | Beach et al. |
| 2022/0161784 | A1* | 5/2022 | Lee .................. G06T 7/13 |
| 2022/0219679 | A1 | 7/2022 | Chen et al. |
| 2022/0358841 | A1* | 11/2022 | Colon ................ G08G 1/147 |
| 2023/0146185 | A1* | 5/2023 | Ho .................. G06V 20/586 382/103 |
| 2023/0169861 | A1* | 6/2023 | Baba ................ G08G 1/0129 340/932.2 |

OTHER PUBLICATIONS

"Extended European Search Report", European Application No. 22209241.3, Sep. 18, 2023, 5 pages.

Luo, et al., "A Statistical Method for Parking Spaces Occupancy Detection via Automotive Radars", 2017 IEEE 85th Vehicular Technology Conference (VTC Spring), Jun. 4, 2017, 5 pages.

"Extended European Search Report", EP Application No. 22198277.0, Apr. 28, 2023, 9 pages.

* cited by examiner

SELECTION OF A PARKING SPACE USING A PROBABILISTIC APPROACH

CROSS-REFERENCE TO RELATED APPLICATIONS

This application claims priority to U.S. Provisional Application Nos. 63/265,925 and 63/265,926, both filed Dec. 22, 2021, the disclosures of which are hereby incorporated by reference in their entirety herein.

BACKGROUND

Some vehicles provide autonomous or automated parking to assist drivers. Parking systems, however, generally use back-in parking for perpendicular parking spaces. These parking systems typically need to pass a parking space to confirm its availability and dimension details. In many parking environments (e.g., crowded parking lots), front-in perpendicular parking is more natural and practical.

SUMMARY

This document describes techniques and systems for selecting a parking space using a probabilistic approach. An example system includes a processor that can determine whether multiple parking spaces are available in proximity to (e.g., in front of) a host vehicle using sensor data. Parking-space characteristics (e.g., a width, entry turning radius, and longitudinal distance to the parking space) of each available parking space are determined using the sensor data. The processor can then choose a selected parking space among the multiple parking spaces based on the parking-space characteristics. The processor or another processor can then control the host vehicle to park in the selected parking space using an assisted-driving or autonomous-driving system. In this way, the described system can select and navigate to a parking space using a probabilistic approach. The processor can choose the parking space based on programmable and customizable parking-space characteristics in some implementations.

The described system can also park the host vehicle in a selected parking space, which is chosen based on the example described above or user input. The system can determine a lateral distance and a longitudinal distance associated with the selected parking space. The system can then determine whether the lateral distance and the longitudinal distance are greater than a minimum inner turning radius of the host vehicle. In response to a determination that the lateral distance and the longitudinal distance are greater than the minimum inner turning radius, the processor or another processor can control the host vehicle to park in the selected parking space using a single-turn maneuver via an assisted-driving or autonomous-driving system. In response to a determination that the lateral distance is not greater than the minimum inner turning radius, the processor can determine whether the longitudinal distance is greater than a longitudinal threshold that is based on a minimum inner turning radius or a configurable inner turning radius (e.g., an optimal or preferred inner turning radius for a parking maneuver). In response to determining that the longitudinal distance is greater than the longitudinal threshold, the processor or another processor can control the host vehicle to park in the selected parking space using a two-turn maneuver.

This document also describes methods performed by the above-summarized system and other configurations set forth herein and computer-executable instructions and means for performing these methods.

This Summary introduces simplified concepts related to selecting a parking space using a probabilistic approach described in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of techniques and systems to select a parking space using a probabilistic approach are described in this document with reference to the following figures. The same numbers are often used throughout the drawings to reference like features and components:

FIG. 6-1 through 6-3 illustrate example selections of a parking space using a probabilistic approach in accordance with techniques of this disclosure;

FIG. 8-1 illustrates an example environment in which a parking system can perform a single-turn maneuver for a selected parking space;

FIG. 8-2 illustrates an example environment in which a parking system can perform a two-turn maneuver for a selected parking space;

FIG. 8-3 illustrates an example environment in which a parking system can perform a two-turn maneuver to park back-in into a selected parking space.

DETAILED DESCRIPTION

Overview

Some vehicles use sensors (e.g., vision-based, radar, lidar, or ultrasonic systems) to provide autonomous or automated parking. These autonomous or automated parking systems generally use back-in parking techniques and need to pass a parking space to confirm the space's availability and dimensions.

Other vehicles can provide automated parking assistance by communicating with infrastructure sensors. For example, a car may be equipped with communication devices (e.g., Vehicle-to-Everything (V2X) systems) to communicate with infrastructure sensors in a parking area. Such techniques select a parking space based on human factors (e.g., proximity to a building entrance or parking area entrance).

In contrast, this document describes techniques and systems to select a parking space using a probabilistic approach. A parking system can use sensors on a host vehicle determine whether multiple parking spaces are available and obtain parking-space characteristics of each available parking space. The parking-space characteristics can include a width, entry turning radius, and a longitudinal distance to the available parking space. The parking system can then determine a selected parking space based on the parking-space characteristics. An assisted-driving or autonomous-driving system can then control the host vehicle to park in the selected parking space. In this way, parking systems can select a parking space in crowded parking lots and control the host vehicle to perform a more-natural and more-practical front-end parking maneuver.

As another example, the parking system can determine whether a parking space (e.g., the selected parking space from the previous example) is available. Sensor data can be used to determine a lateral distance and longitudinal distance associated with the selected parking space. The parking system can determine whether the lateral distance and the longitudinal distance are greater than a minimum inner turning radius of the host vehicle. If the lateral distance and the longitudinal distance are greater than the minimum inner turning radius, the assisted-driving or autonomous-driving system can control the host vehicle to park in the selected parking space using a single-turn maneuver. If the lateral distance is not greater than the minimum inner turning radius, but the longitudinal distance is greater than a longitudinal threshold, the assisted-driving or autonomous-driving system can control the host vehicle to park in the selected parking space using a two-turn maneuver. In this way, parking systems can control the host vehicle to perform a practical parking maneuver for crowded or congested parking lots based on parking-space characteristics.

These examples are just two examples of the described techniques and systems for selecting a parking space using a probabilistic approach and parking therein. This document describes other examples and implementations.

Operating Environment

Figure 1:
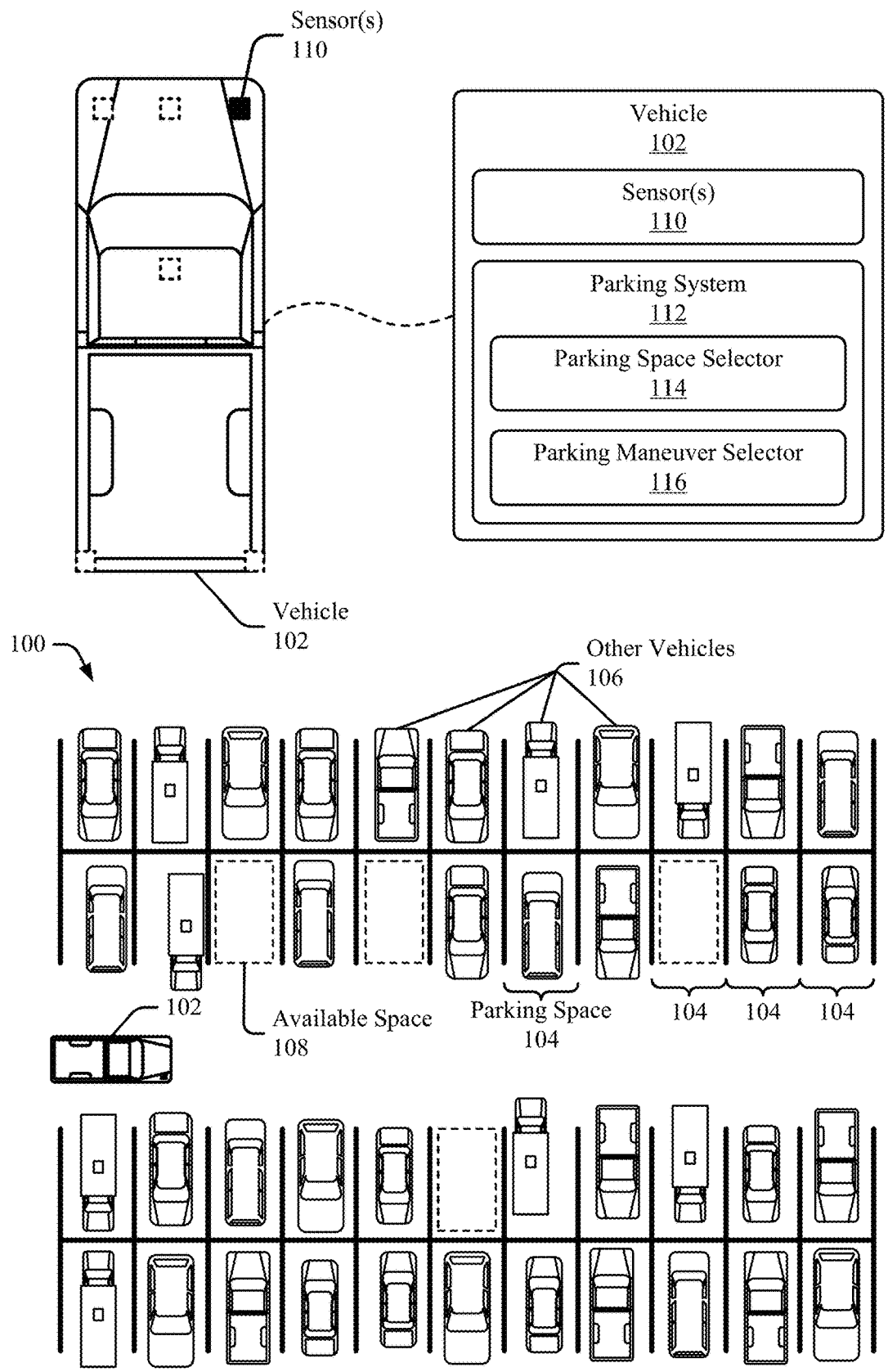
FIG. 1 illustrates an example environment in which a parking system can select a parking space using a probabilistic approach in accordance with techniques of this disclosure.

FIG. 1 illustrates an example environment 100 in which a parking system 112 of a vehicle 102 (e.g., a host vehicle) can select a parking space 104 using a probabilistic approach in accordance with the techniques of this disclosure. In the depicted environment 100, the vehicle 102 is in a parking lot or other environment that includes multiple parking spaces 104. The parking spaces 104 are illustrated in FIG. 1 as being perpendicular to a travel path of the vehicle 102. In other implementations, the parking spaces 104 can be at an angle or parallel to the travel path of the vehicle 102. The environment 100 includes other vehicles 106 parked in some of the parking spaces 104. The environment 100 also includes multiple available spaces 108; in the depicted environment 100, there are four available spaces 108 in front of the vehicle 102.

Although illustrated as a passenger truck, the vehicle 102 can represent other types of motorized vehicles (e.g., a car, an automobile, a motorcycle, a bus, a tractor, a semi-trailer truck), watercraft (e.g., a boat), or aircraft (e.g., an airplane). Similarly, the other vehicles 106 can be other types of motorized vehicles, watercraft, aircraft, or other objects located in the parking spaces 104 (e.g., dumpsters, shopping carts).

The vehicle 102 includes one or more sensors 110 and the parking system 112. In the depicted environment 100, the sensors 110 are mounted to, or integrated within, a front portion of the vehicle 102. As described in greater detail below, the sensors 110 can include camera systems, radar systems, lidar systems, or ultrasonic systems. The sensors 110 can provide sensor data regarding the parking spaces 104, the other vehicles 106, and the available spaces 108 to the parking system 112.

In the depicted implementation, the sensors 110 are mounted on the front of the vehicle 102 and provide parking-space characteristics for the available spaces 108. The sensors 110 can detect the parking-space characteristics from any exterior surface of the vehicle 102. For example, vehicle manufacturers can integrate a radar system, a lidar system, camera, or ultrasonic sensor into a bumper, side mirror, headlights, or any other interior or exterior location where objects and parking spaces 104 require detection. In some cases, the vehicle 102 includes multiple sensors and/or sensor types, such as a radar system and a camera, that provide a larger instrument field-of-view or improved detection of different parking-space characteristics. In general, vehicle manufacturers can design the locations of the sensors 110 to provide a particular field-of-view that encompasses a region of interest. Example fields-of-view include a 180-degree field-of-view, one or more 90-degree fields-of-view, and so forth, which can overlap or be combined into a field-of-view of a particular size.

The parking system 112 can provide assisted or autonomous parking to a driver of the vehicle 102. For example, the parking system 112 can identify a selected parking space (e.g., an optimal parking space) and a parking maneuver based on parking-space characteristics determined from the sensor data. The parking-space characteristics can include a width, an entry turning radius, and a longitudinal distance to each available space 108. As another example, the parking system 112 can provide an input to an assisted-driving or autonomous-driving system to park the vehicle 102 in one of the available spaces 108.

The parking system 112 can include a parking space selector 114 and a parking maneuver selector 116. The parking system 112, the parking space selector 114, and the parking maneuver selector 116 can be implemented using hardware, software, firmware, or a combination thereof. The parking space selector 114 can identify the available spaces 108 and select a parking space among the available spaces 108 for the vehicle 102. In this way, the parking space selector 114 can select a parking space in crowded parking lots and allow the vehicle 102 to perform a more-natural and more-practical front-end parking maneuver. The parking maneuver selector 116 can determine a maneuver type (e.g., front-in parking, back-in parking, single-turn maneuver, two-turn maneuver) and maneuver path for parking the vehicle 102 in the selected parking space. In this way, the parking maneuver selector 116 can control the vehicle 102 to perform a parking maneuver without having to pass it.

Figure 2:
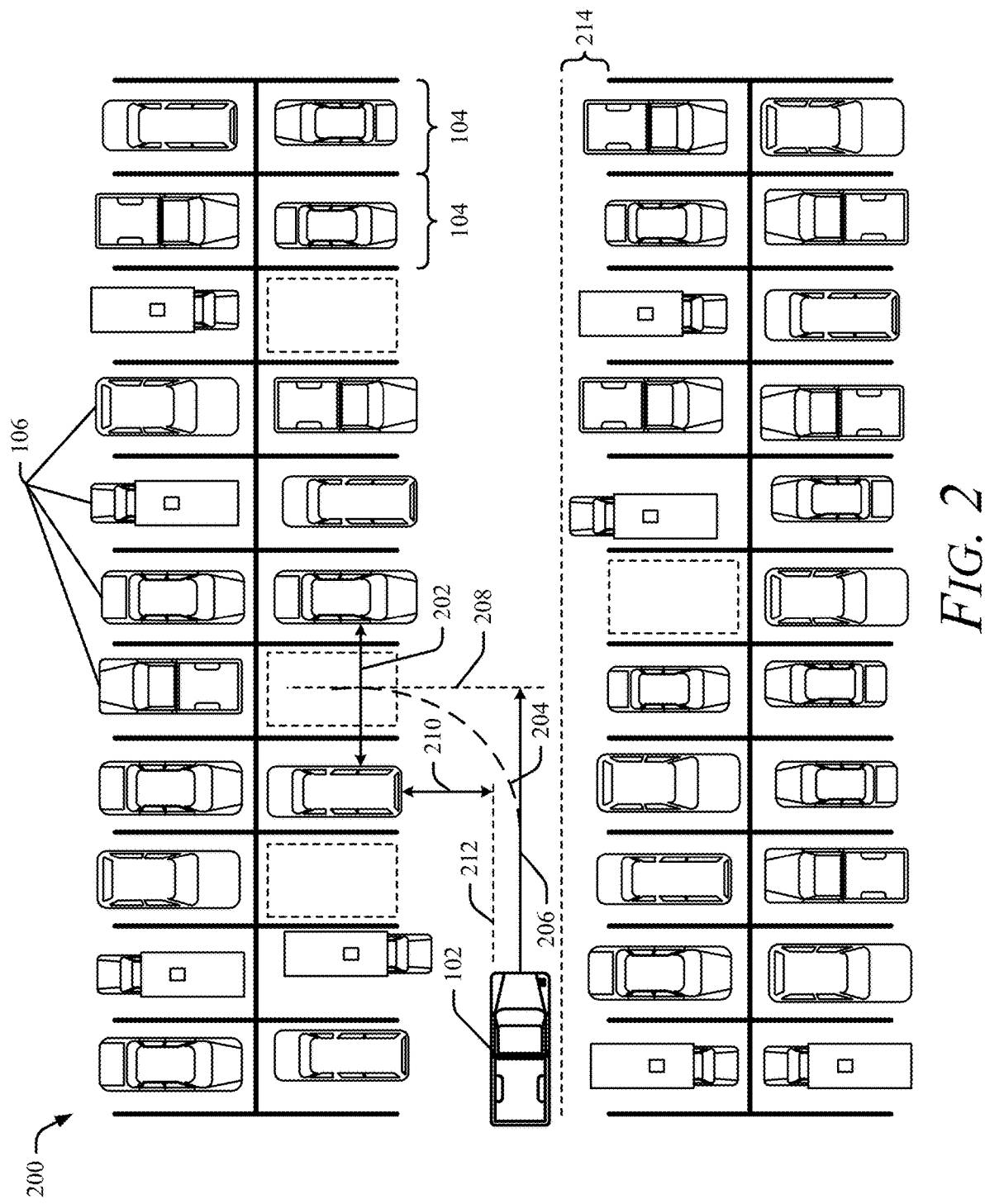
FIG. 2 illustrates another example environment in which a parking system can select a parking space or parking maneuver based on parking-space characteristics in accordance with techniques of this disclosure.

FIG. 2 illustrates another example environment 200 in which the parking system 112 can select a parking space or parking maneuver based on parking-space characteristics in accordance with techniques of this disclosure. Like the environment 100 of FIG. 1, the environment 200 depicts the vehicle 102 in a parking lot with multiple parking spaces 104. The parking lot also includes other vehicles 106 and several available spaces 108.

Using the sensors 110, the parking system 112 can determine parking-space characteristics associated with the available spaces 108. The parking-space characteristics can include a width 202, an entry turning radius 204, and a longitudinal distance 206 associated with each available space 108. The parking system 112 can measure the width 202 associated with an available space 108 as approximately the distance between the other vehicles 106 parked in the adjacent parking spaces. If another vehicle 106 is not parked in an adjacent parking space, then the parking system can use a predetermined distance offset from the parking-space line as an endpoint for measuring the width 202.

The entry turning radius 204 represents the radius of the travel path to enter the available space 108 from the current lateral position of the vehicle 102. The entry turning radius 204 can, for example, be defined using a longitudinal center of the vehicle 102 and a lateral center 208 of the available space. The entry turning radius 204 can be dependent on the width 202 and the longitudinal distance 206. The longitudinal distance 206 can also represent a distance from the front of the vehicle 102 to the lateral center 208 of the available space 108. The longitudinal distance 206 can also be measured as the distance from the longitudinal position of the rear axle of the vehicle 102 to a left edge of the intended parking position of the vehicle 102 within the available space 108. The intended parking position can be defined to place the vehicle 102 in a longitudinal center and the lateral center 208 of the available space 108. The parking system 112 can use different reference points to define or measure the width 202, the entry turning radius 204, and the longitudinal distance 206 associated with the available spaces 108.

The parking system 112 can also determine other parking-space characteristics associated with the available spaces 108. For example, the parking system 112 can determine a lateral distance 210 associated with the parking space. The lateral distance 210 can indicate a distance between another vehicle 106 in an adjacent parking space and the vehicle 102. In particular, the parking system 112 can measure the distance from an inner edge 212 of the rear axle (e.g., the outside of the rear axle nearest the available space 108) to the nearest portion of the other vehicle 106 in the adjacent parking space. The lateral distance 210 can also be measured from a predetermined offset 214 (e.g., a safety distance) from the edges of the parking spaces 104. Alternatively, the lateral distance 210 can be measured as the inner edge 212 of the rear axle to an offset distance (e.g., the longitudinal distance between the front axle and rear axle of the vehicle 102) from the nearest portion of the other vehicle 106 in the adjacent parking space.

The parking system 112 can also determine a space depth (e.g., a longitudinal depth of each available space 108), space type (e.g., handicapped, compact car, reserved, electric-vehicle only, autonomous-only), neighboring vehicle classification, and shading classification. The neighboring vehicle classification can identify the type of vehicles in adjacent parking spaces (e.g., luxury or expensive vehicles, compact vehicles). The shading classification can identify whether any shade is currently available or will be available during an expected parking duration. The parking system 112 can also consider other characteristics (e.g., distance to a building associated with the parking lot or a programmed destination, distance from parking lot entrance or exit, parking-space slope).

As described in greater detail below, the parking space selector 114 can use the parking-space characteristics to determine a selected parking space among multiple available spaces 108. Similarly, the parking maneuver selector 116 can use the parking-space characteristics to determine a maneuver type and maneuver path for controlling the operation of the vehicle 102 to park within the selected parking space.

Vehicle Configuration

Figure 3:
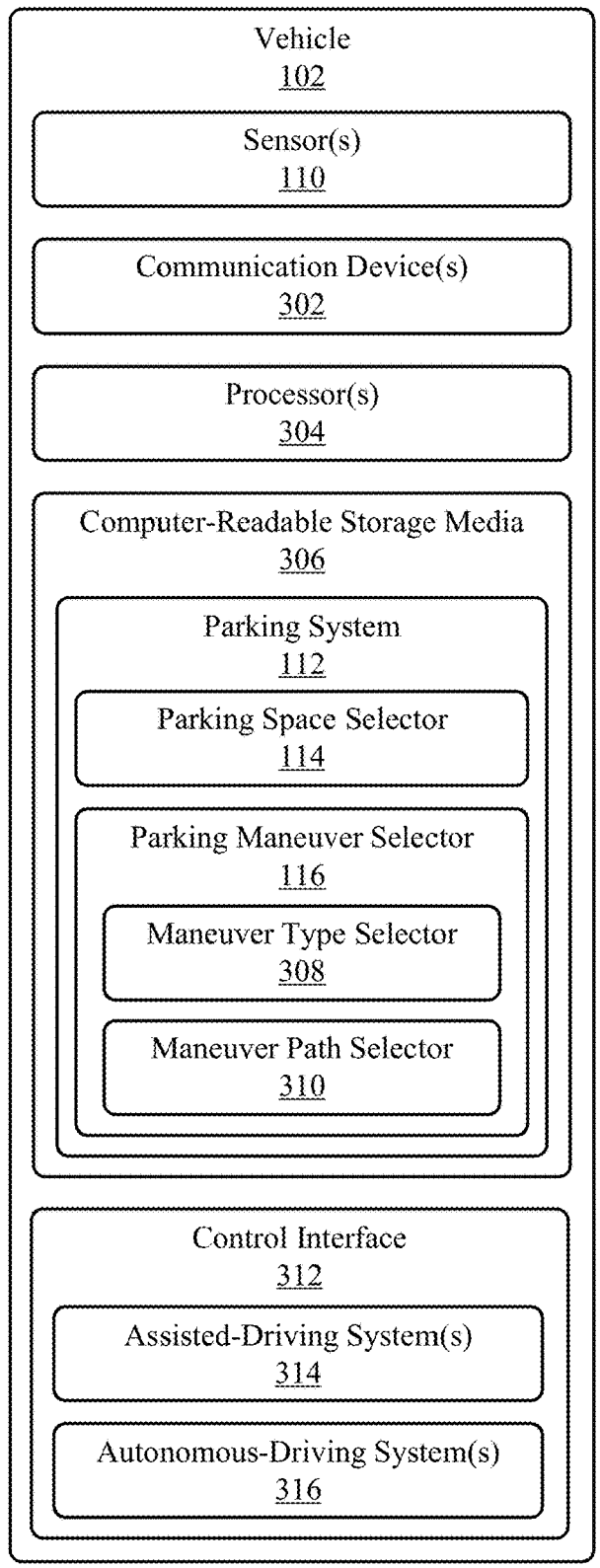
FIG. 3 illustrates an example configuration of a vehicle with a parking system that can select a parking space using a probabilistic approach.

FIG. 3 illustrates an example configuration of a vehicle with a parking system that can select a parking space using a probabilistic approach. As described for FIG. 1, the vehicle 102 includes the sensors 110 and the parking system 112, which includes the parking space selector 114 and the parking maneuver selector 116. In addition, the vehicle 102 can include one or more communication devices 302, one or more processors 304, computer-readable storage media (CRM) 306, and a control interface 312 to one or more vehicle-based systems, including one or more assisted-driving systems 314 and one or more autonomous-driving system 316.

The communication devices 302 can include a sensor interface and a vehicle-based system interface. The sensor interface and the vehicle-based system interface can transmit data (e.g., radar data, range computations, and other parking-space characteristics associated with the available spaces 108) over a communication bus of the vehicle 102, for example, when the individual components of the sensors 110 and/or the parking system 112 are integrated within the vehicle 102.

The processors 304 (e.g., an energy processing unit or electronic control unit) can be a microprocessor or a system-on-chip. The processors 304 can execute instructions stored in the CRM 306, on one or more disks, memories, or other non-transitory computer-readable storage medium. For example, the processor 304 can process sensor data from the sensors 110 and execute instructions loaded from the CRM 306 to cause the processor 304 to determine parking-space characteristics for the available spaces 108. The instructions may cause the processor 304 to be configured to select a parking space using the parking system 112 and/or generate a parking maneuver, including the maneuver type and maneuver path, for at least one automotive system. For example, the processor 304 can execute the instructions on the CRM 306 to configure the processor 304 to control, based on sensor data, an autonomous or semi-autonomous driving system of the vehicle 102 to cause the vehicle 102 to park in a selected parking space.

The parking system 112 can be stored in the CRM 306. As described for FIG. 1, the parking system 112 can include the parking space selector 114 and the parking maneuver selector 116. The parking space selector 114 can identify the available spaces 108 and select a parking space (e.g., an optimal parking space) for the vehicle 102. The selected parking space can be presented to the driver of the vehicle 102 on a display (e.g., an overlay on a photographic or video feed of the parking environment or a graphical representation of the parking environment). The driver can then navigate and park in the selected parking space. The driver can also provide an input (e.g., via voice or touch input) to the parking system 112 to have the assisted-driving system 314 or the autonomous-driving system 316 perform the parking maneuver. In this way, the parking space selector 114 can identify a parking space in crowded parking lots and cause the vehicle 102 to perform a more-natural and more-practical parking maneuver without having to pass the selected parking space.

The parking maneuver selector 116 includes a maneuver type selector 308 and a maneuver path selector 310. The maneuver type selector 308 can determine a maneuver type (e.g., front-in parking, back-in parking, single-turn maneuver, two-turn maneuver) for parking in the selected parking space. For example, the maneuver type selector 308 can determine, based on the parking-space characteristics, that the vehicle 102 is unable to perform a single-turn maneuver into the selected parking space because the entry turning radius 204 is smaller than the minimum inner turning radius of the vehicle 102. The maneuver type selector 308 can also determine, based on driver preferences or input, to perform a single- or two-turn maneuver followed by a back-in movement to park in the selected parking space.

The maneuver path selector 310 can determine a maneuver path for parking in the selected parking space. As described in greater detail below, the maneuver path selector 310 can determine turning radii for the maneuver path to safely park the vehicle 102. In some implementations, the maneuver path selector 310 can output a suggested maneuver path to a display for the driver to follow for entry into the selected parking space. In this way, the maneuver type selector 308 and the maneuver path selector 310 can control the vehicle 102 to perform parking maneuvers for crowded or congested parking lots.

The vehicle 102 also includes the control interface 312 to one or more vehicle-based systems, which individually or in combination provide a way for receiving a parking-space selection and parking maneuver to control the vehicle 102. Some examples of vehicle-based systems to which the control interface 312 supplies parking information include the assisted-driving system 314 and the autonomous-driving system 316; each may rely on information output from the parking system 112.

For example, the vehicle-based systems may rely on data, which is communicated via the communication devices 302 and obtained from the sensors 110, to operate the vehicle 102 (e.g., performing a single-turn or two-turn parking maneuver). Generally, the control interface 312 can use data provided by the parking system 112 and/or sensors 110 to control operations of the vehicle 102 to park in selected parking spaces. The assisted-driving system 314 can alert a driver of a selected parking space via a display and/or perform a parking maneuver into the selected parking space. As another example, the autonomous-driving system 316 can navigate the vehicle 102 to park in the selected parking space.

Example Method to Select a Parking Space

Figure 4:
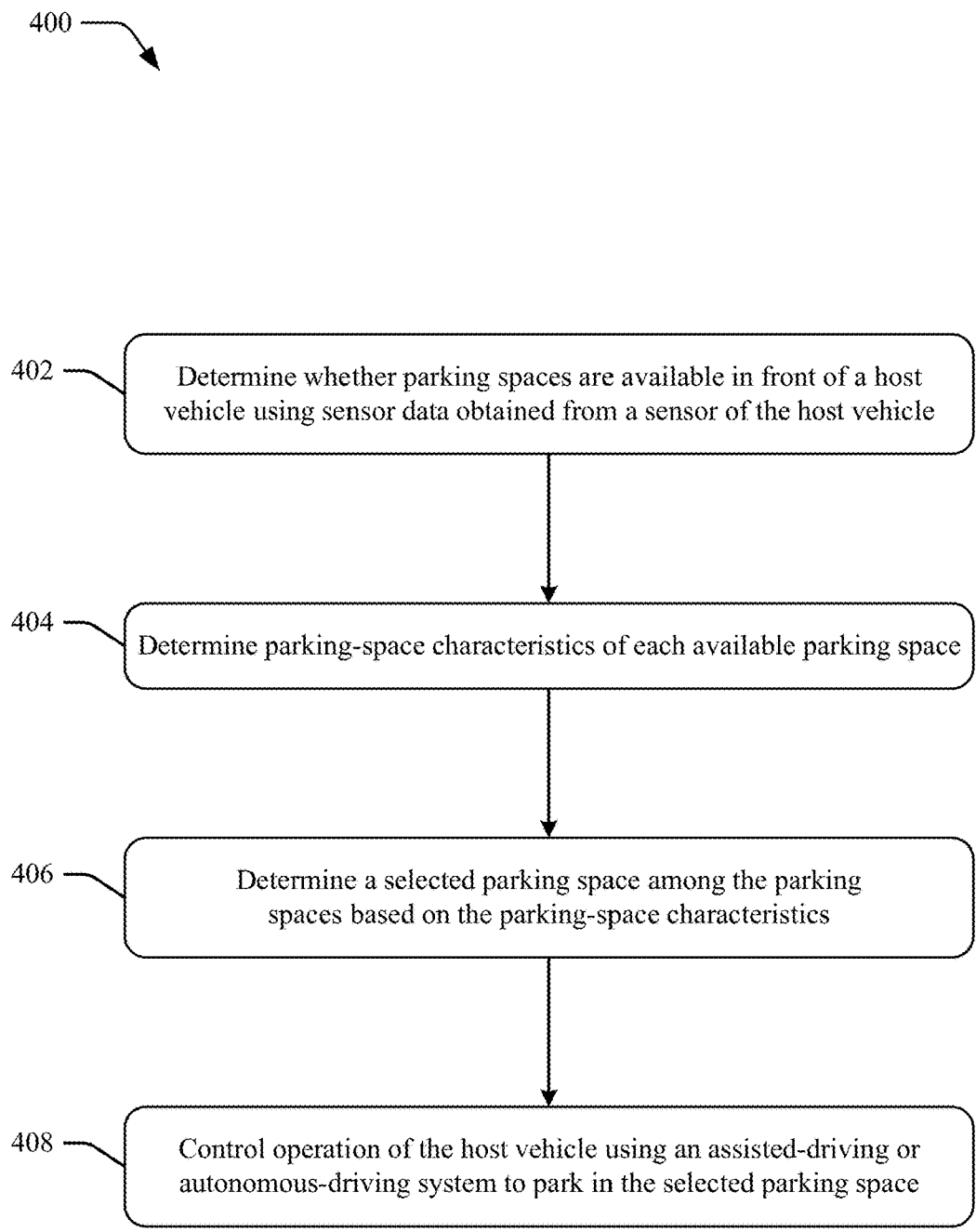
FIG. 4 illustrates an example method of a parking system to select a parking space using a probabilistic approach.

FIG. 4 illustrates an example method 400 of a parking system to select a parking space using a probabilistic approach. Method 400 is shown as operations (or acts) performed, but not necessarily limited to the order or combinations in which the operations are shown herein. Further, any one of one or more of the operations may be repeated, combined, or reorganized to provide other methods. In portions of the following discussion, reference may be made to the environment 100 of FIG. 1, and entities detailed in FIGS. 1 through 3, reference to which is made for example only. The techniques are not limited to performance by one entity or multiple entities.

At 402, it is determined whether parking spaces are available in front of a host vehicle using sensor data obtained from a sensor of the host vehicle. For example, the parking system 112 or the parking space selector 114 can determine whether there are available spaces 108 in front of the vehicle 102 among the parking spaces 104 within the environment 100. The available spaces 108 can be identified using sensor data obtained from the sensors 110. The sensors 110 can include radar systems, lidar systems, ultrasonic systems, or vision-based systems. The available spaces 108 can also be identified based on data obtained from external sensors, including infrastructure sensors, drone-based sensors, or sensors installed on the other vehicles 106 near the vehicle 102 or within the environment 100.

The parking spaces 104 can be approximately perpendicular or at an angle to a travel path of the vehicle 102. In other environments, the parking spaces 104 can be approximately parallel to the travel path of the vehicle 102.

At 404, parking-space characteristics of each available parking space are determined. For example, the parking system 112 or the parking space selector 114 can use the sensor data to determine parking-space characteristics of the available spaces 108. The parking-space characteristics include a width, entry turning radius, and a longitudinal distance to the available space 108. The parking-space characteristics can also include at least one of a space depth, space type, neighboring vehicle classification, or shading classification for the available spaces 108.

At 406, a selected parking space is determined among the parking spaces based on the parking-space characteristics. For example, the parking system 112 or the parking space selector 114 can determine a selected parking space among the available spaces 108 based on the parking-space characteristics. As described in greater detail with respect to FIG. 5, the selected parking space can be determined using conditional probability distributions for the parking-space characteristics and an application of the Bayesian theorem to the conditional probability distributions for the parking-space characteristics. The selected parking space can be determined using a machine-learned model, a reinforced learning model, or a deep learning model.

At 408, the operation of the host vehicle is controlled using an assisted-driving or autonomous-driving system to park in the selected parking space. For example, the parking system 112 or the parking maneuver selector 116 can control operation of the vehicle 102 to park in the selected parking space. The vehicle 102 can be controlled using the assisted-driving system 314 or the autonomous-driving system 316. The vehicle 102 can park via a front-in parking maneuver, which can include a single-turn or two-turn maneuver path. Alternatively, the vehicle 102 can park in the selected parking space by performing a back-in parking maneuver that approximately mirrors a front-in parking maneuver for a parking space opposite the selected parking space.

Figure 5:
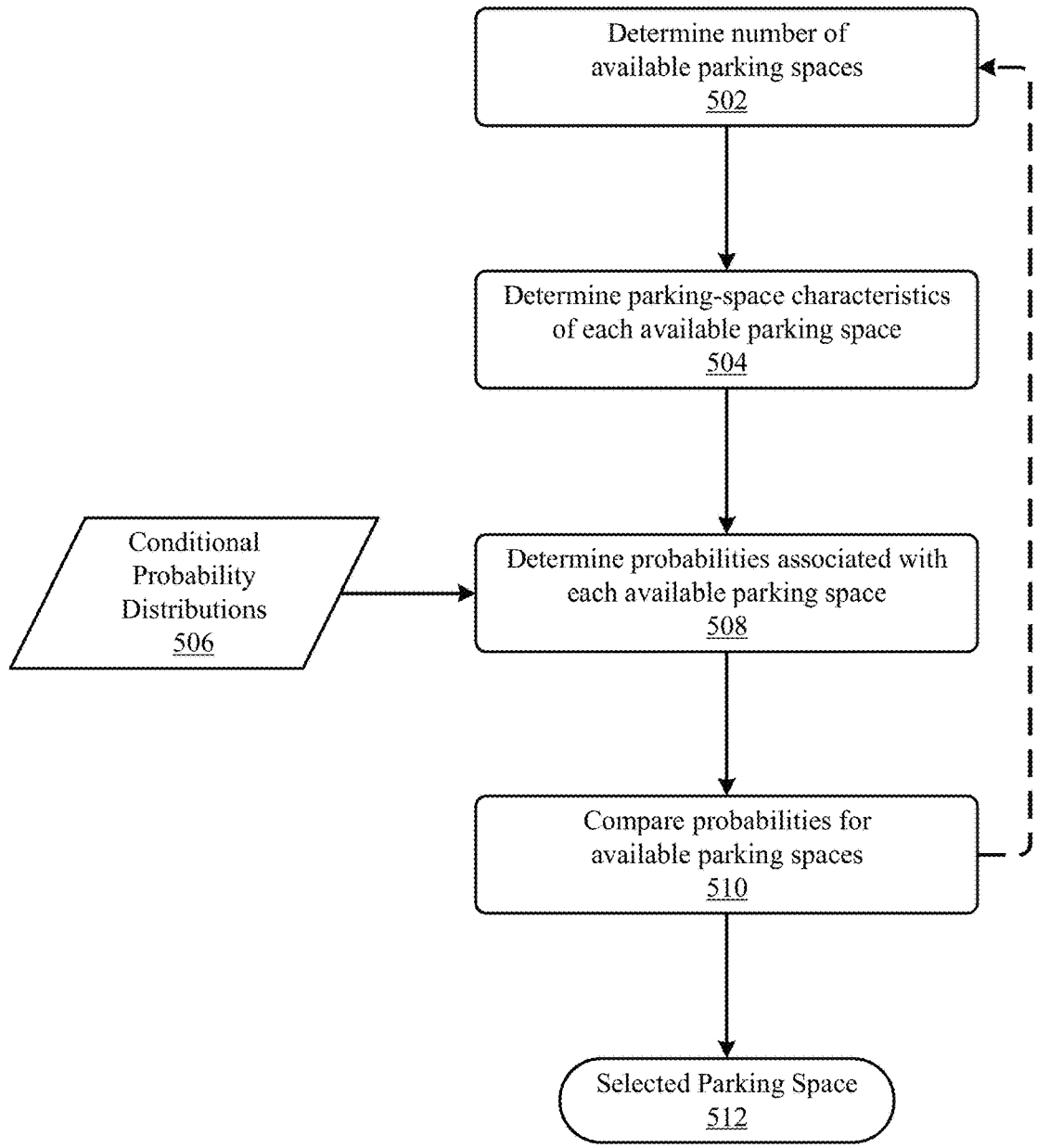
FIG. 5 illustrates an example flowchart of the described techniques and systems to select a parking space using a probabilistic approach.

FIG. 5 illustrates an example flowchart 500 of the described techniques and systems to select a parking space using a probabilistic approach. The parking system of FIG. 5 can, for example, be the parking system 112 and/or the parking space selector 114 of FIGS. 1 and 3. The output of the flowchart 500 is a selected parking space 512. The selected parking space 512 can be displayed to the driver of vehicle 102 and/or provided as an input to the parking system 112 to determine a parking maneuver, which is described in greater detail with respect to FIGS. 7 through 9.

At 502, the parking system 112 can determine the number of available spaces 108 in front of the vehicle 102 along its current travel path. The number, n, of available spaces 108 can be identified using sensor data from the sensors 110. As described above, the sensors 110 can include radar systems, lidar systems, ultrasonic systems, vision-based systems, or other types of sensor systems.

At 504, the parking system 112 can determine parking-space characteristics associated with each available space 108. The parking-space characteristics can be determined using the sensor data from the sensors 110 or data from external sensors. The parking-space characteristics include the width 202 (W), entry turning radius 204 (TR), and longitudinal distance 206 (Dis) to the available space 108. In other implementations, the parking system 112 can determine and utilize other parking-space characteristics (e.g., space depth, space type, neighboring vehicle classification, or shading classification).

The parking system 112 can store conditional probability distributions 506 associated with the parking-space characteristics in the CRM 306. The conditional probability distributions 506 identify how probable an available space 108 is likely to be chosen as the selected parking space 512 (Sel) given its parking-space characteristics. For example, the width 202 can have a conditional probability distribution (e.g., P(W|Sel)) with a mean of 4.7 and a variance of 1.0. The entry turning radius 204 can have a conditional probability distribution (e.g., P(TR|W, Dis, Sel)) with a mean of 5.0 and a variance of 1.0. As described above, the entry turning radius 204 can be dependent on the width 202 and the longitudinal distance 206. The longitudinal distance 206 can have a conditional probability distribution (e.g., P(Dis|Sel)) with a mean of 6.0 and a variance of 5.0. If additional parking-space characteristics are used to determine the selected parking space 512, the parking system 112 can store conditional probability distributions 506 associated with those characteristics. In addition, user preferences can also be incorporated into the parking system 112 by adjusting the conditional probability distributions 506 accordingly.

At 508, the parking system 112 can determine probabilities associated with each available space 108 using the parking-space characteristics and the conditional probability distributions 506. The parking system 112 can determine the probability of a particular available space 108 being the selected parking space 512 (Sel) using an application of the Bayesian theorem. Given the width 202 (W), entry turning radius 204 (TR), and longitudinal distance 206 (Dis), the probability of a particular available space 108 (e.g., the ith available space) being the selected parking space 512 among n number of available spaces 108 is represented by Equation (1):

$$P(Sel|W,TR,Dis) = \frac{P(W,TR,Dis|Sel)P(Sel)}{\sum_{i=1}^{n}[P(W,TR,Dis|Sel)P(Sel)]} \quad \text{Equation (1)}$$

Based on the conditional probability distributions 506 for the width 202 (W), entry turning radius 204 (TR), and longitudinal distance 206 (Dis), Equation (1) can be rewritten as Equation (2):

$$P(Sel|W,TR,Dis) = \frac{P(W|Sel)P(TR|W,Dis,Sel)P(Dis|Sel)P(Sel)}{\sum_{i=1}^{n}[P(W|Sel)P(TR|W,Dis,Sel)P(Dis|Sel)P(Sel)]} \quad \text{Equation (2)}$$

In some implementations, the parking system 112 can place an upper limit on the conditional probability of a particular parking-space characteristic. For example, if the width 202 (e.g., W(i)) of a particular available space 108 is greater than the mean of its associated conditional probability distribution, then the width 202 can be set as equal to the mean. Similarly, if the entry turning radius 204 (e.g., TR(i)) of a particular available space 108 is greater than the mean of its associated conditional probability distribution, then the entry turning radius can be set as equal to the mean.

At 510, the parking system 112 can compare probabilities for the available spaces 108 and select the available space 108 with the highest probability as the selected parking space 512. The parking system 112 can use a probability threshold (e.g., 0.5) as a lower minimum for the selected parking space 512. In other implementations, the selected parking space 512 can be the nearest available space 108 that has a probability value above the probability threshold. If the parking system 112 does not identify a selected parking space 512, the parking system 112 can cause the vehicle 102 to continue forward in the environment 100 (e.g., down the current parking row or into an adjacent parking row) until a selected parking space 512 is identified. An example implementation of the flowchart 500 is described with respect to FIGS. 6-1 through 6-3.

Figures 1, 6:
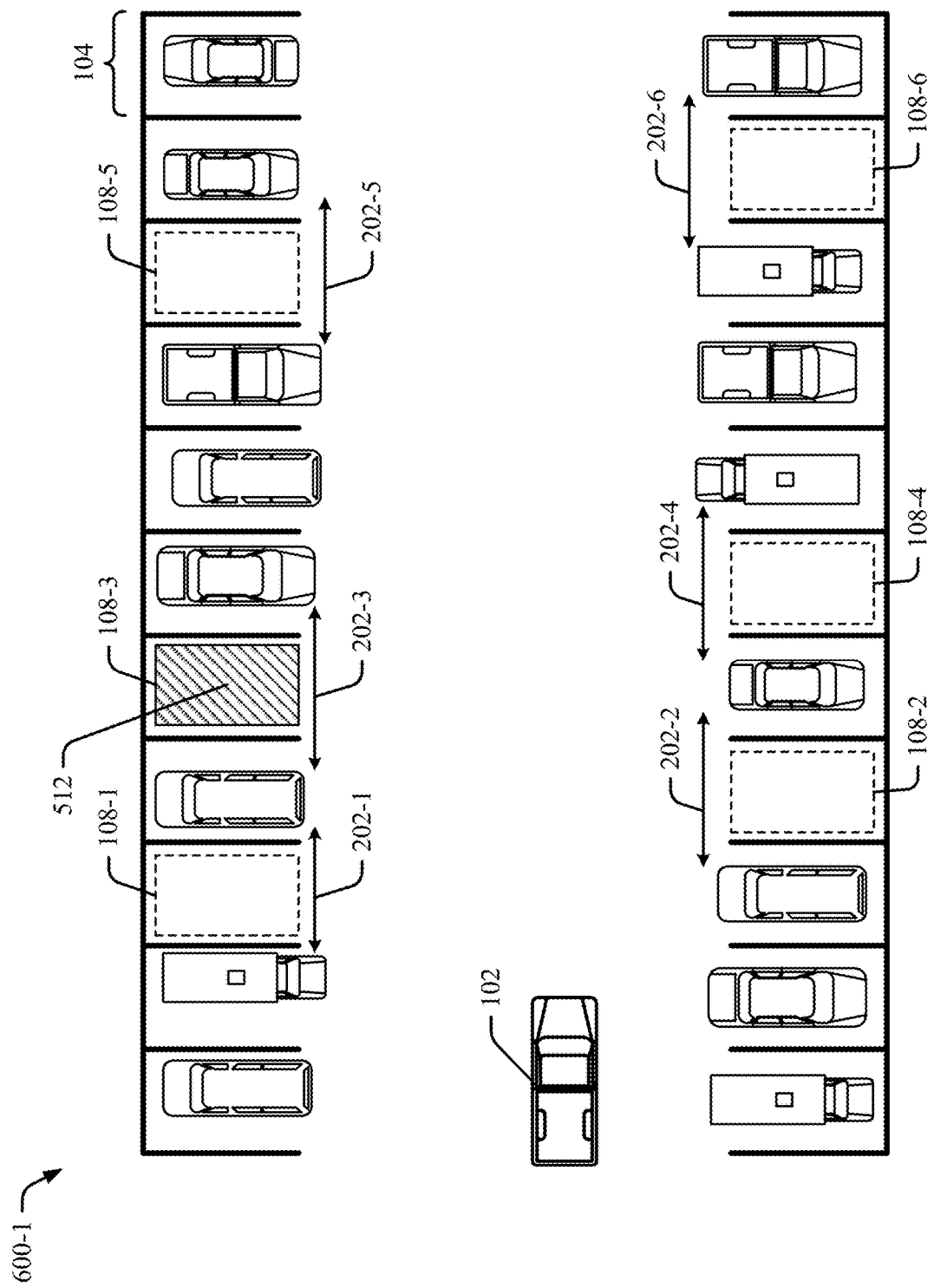
Figures 2, 6:
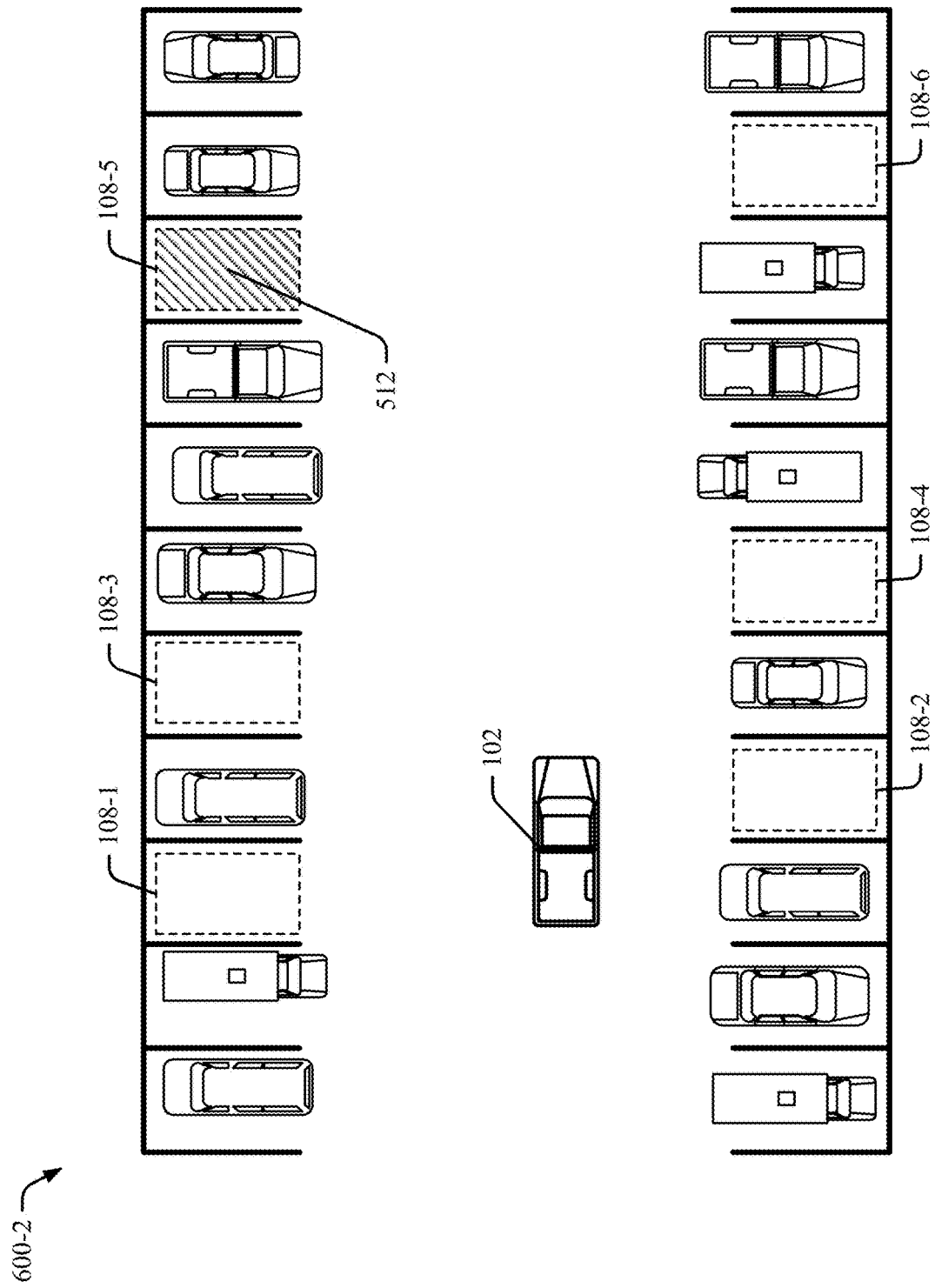
Figures 3, 6:
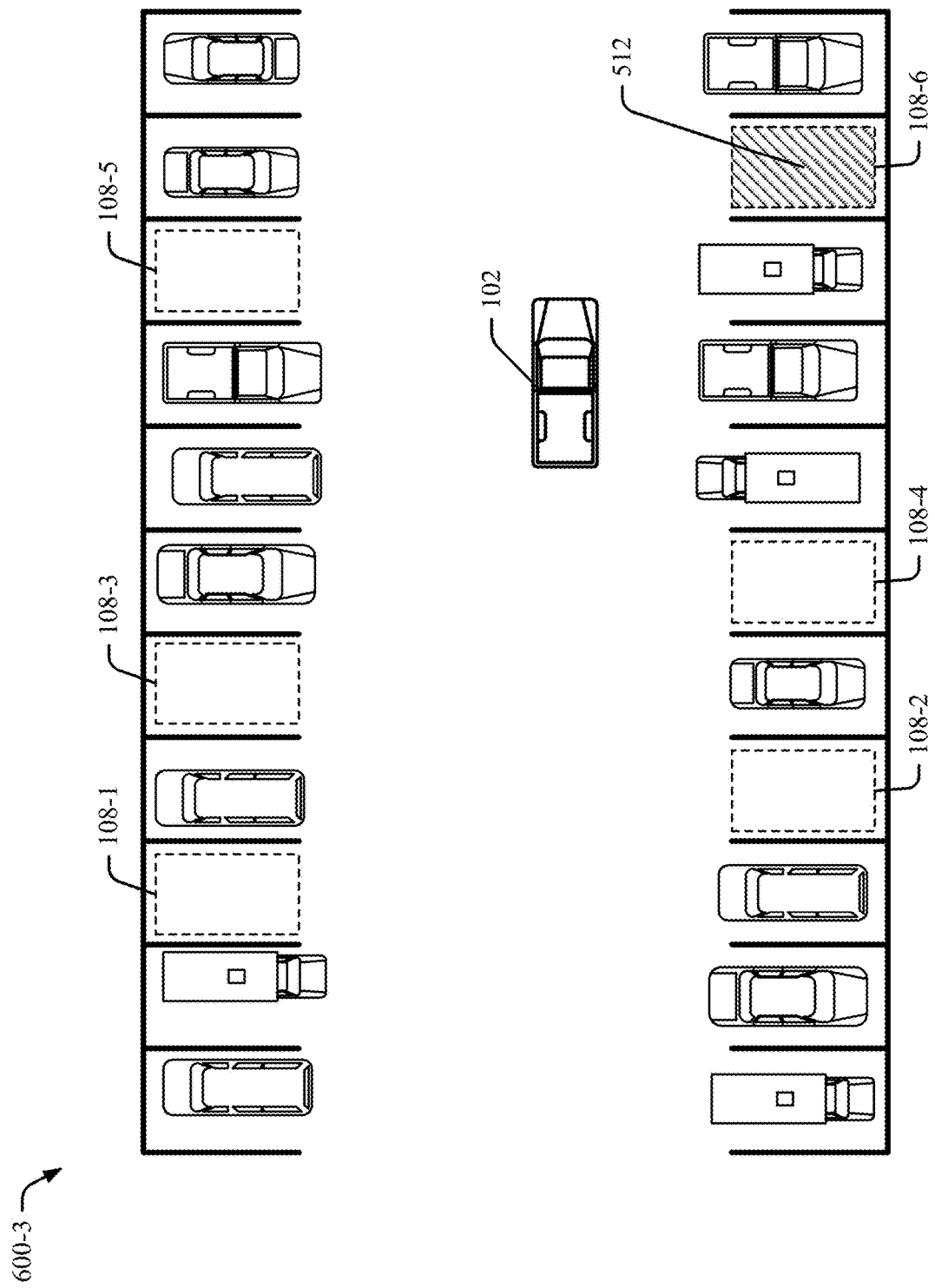

FIG. 6-1 through 6-3 illustrate example selections of a parking space using a probabilistic approach in accordance with techniques of this disclosure. In the illustrated environments 600-1 through 600-3, a vehicle (e.g., the vehicle 102) is in a parking environment (e.g., a parking lot at a grocery store) with several available spaces 108. In particular, the environments 600-1 through 600-3 include six available parking spaces 108, which in this example are designated as: available space 108-1, available space 108-2, available space 108-3, available space 108-4, available space 108-5, and available space 108-6.

In FIG. 6-1, six available spaces 108 are potential parking spaces 104. The vehicle 102 can use the parking system 112 to identify or determine the selected parking space 512. For example, the selected parking space 512 can be identified using the techniques and systems described with respect to FIGS. 4 and 5. In the depicted implementation, the selected parking space 512 is determined based on the space width 202 (e.g., the space width 202-1 for the available space 108-1), the entry turning radius 204, and the longitudinal distance 206 associated with each available space 108. In the depicted environment 600-1, the available spaces 108 each have a respective space width 202, a respective entry turning radii 204, and a respective longitudinal distances 206, as listed in Table 1:

TABLE 1

| Space | Space Width 202 | Entry Turning Radius 204 | Longitudinal Distance 206 |
| --- | --- | --- | --- |
| 108-1 | 3 m | 5.0 m | 2 m |
| 108-2 | 4 m | 3.5 m | 4 m |
| 108-3 | 5 m | 5.0 m | 6 m |
| 108-4 | 4 m | 3.5 m | 8 m |
| 108-5 | 4 m | 5.0 m | 15 m |
| 108-6 | 4 m | 3.5 m | 17 m |

The parking system 112 can determine the space widths 202 as the distance between the other vehicles 106 in adjacent parking spaces based on sensor data from the sensors 110. In the environment 600-1, the available space 108-1 has the smallest space width 202-1 at 3 meters and the available space 108-3 has the largest space width 202-3 at 5 meters.

The parking system 112 can determine the entry turning radii 204 as the turning radius necessary to enter the available space 108. In this example, the entry turning radius 204 is determined based on the lateral distance to the available space 108 as determined from the sensor data. For example, the available spaces 108-1, 108-3, and 108-5 to the left of the vehicle 102 have an entry turning radius of 5 meters each; in contrast, the available spaces 108-1, 108-3, and 108-5 have an entry turning radius of 3.5 meters each.

The parking system 112 can determine the longitudinal distances as the distance to the available space 108 based on sensor data from the sensors 110. In this example, the available spaces 108-1, 108-2, 108-3, 108-4, 108-5, and 108-6 have a longitudinal distance of 2 meters, 4 meters, 6 meters, 8 meters, 15 meters, and 17 meters, respectively.

Based on the parking-space characteristics, the parking system 112 determines a probability of being the selected parking space 512 of 0.277, 0.108, 0.614, 0.001, 0, and 0 for the available spaces 108-1, 108-2, 108-3, 108-4, 108-5, and 108-6, respectively. As a result, the parking system 112 identifies the available space 108-2 as the selected parking space 512. If the parking system 112 had a selection threshold (e.g., 0.7) greater than the selection probability of each available space 108, the parking system 112 could continue along the environment 600-1 until an available space 108 satisfied this selection threshold.

In this implementation, the selection threshold can be set at 0.5 and the parking system 112 can cause the assisted-driving system 314 or the autonomous-driving system 316 to park in the selected parking space 512. Alternatively, the parking system 112 can provide the driver of the vehicle 102 an option to override or veto the selected parking space 512 and continue along the environment 600-1 until another selected parking space 512 is identified. The driver can, for example, veto the selected parking space 512 based on personal preferences.

In FIG. 6-2, three available spaces 108 (e.g., available spaces 108-4, 108-5, and 108-6) are potential parking spaces 104 for the vehicle 102. The vehicle 102 has either passed the other available spaces (e.g., available spaces 108-1 and 108-2) or the longitudinal distance is smaller than the minimum inner turning radius of the vehicle, which is true for the available space 108-3.

The vehicle 102 can use the parking system 112 to identify the selected parking space 512 in the environment 600-2. In particular, the parking system 112 can update the probabilities associated with the available spaces 108 being the selected parking space 512. In the environment 600-2, the parking system 112 determines a probability of being the selected parking space 512 of 0.215, 0.686, and 0.099 for the available spaces 108-4, 108-5, and 108-6, respectively. As a result, the parking system 112 identifies the available space 108-5 as the selected parking space 512 for the environment 600-2.

The parking system 112 can use error codes or similar techniques to exclude available spaces 108. The error codes can include, for example, the space width is too small, the entry turning radius is too small, or the longitudinal distance is too small. The error codes can allow the parking system 112 to filter available spaces 108 as the vehicle 102 travels through the parking environment 600-2. In this way, the parking system 112 can efficiently determine probabilities associated with the available spaces 108 that satisfy the filters.

In the environment 600-3 of FIG. 6-3, a single available space 108 (e.g., the available space 108-6) is a potential parking space 104 for the vehicle 102. The vehicle 102 has either passed the other available spaces (e.g., available spaces 108-1, 108-2, 108-3, and 108-4) or the longitudinal distance is smaller than the minimum inner turning radius of the vehicle 102, which is true for the available space 108-5.

The vehicle 102 can use the parking system 112 to identify the selected parking space 512 in the environment 600-3. In particular, the parking system 112 can update the probabilities associated with the available spaces 108 being the selected parking space 512. The parking system 112 determines a probability of being the selected parking space 512 of 1.0 for the available space 108-6. As a result, the parking system 112 identifies the available space 108-6 as the selected parking space 512 for the environment 600-3.

Example Method to Determine a Parking Maneuver

Figure 7:
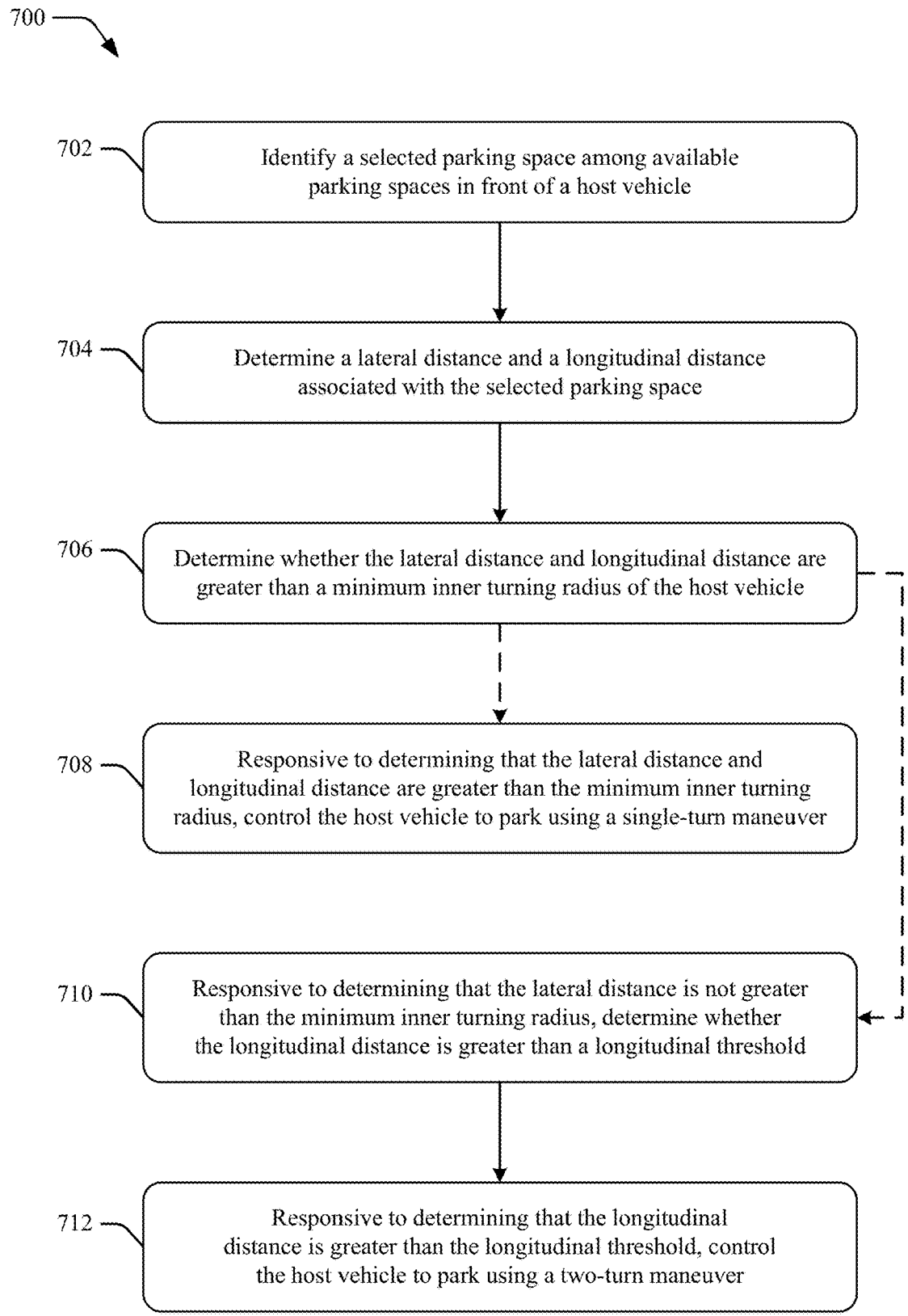
FIG. 7 illustrates an example method of a parking system to determine a parking maneuver for a selected parking space.

FIG. 7 illustrates an example method 700 of a parking system to determine a parking maneuver for a selected parking space. Method 700 is shown as sets of operations (or acts) performed, but not necessarily limited to the order or combinations in which the operations are shown herein. Further, any one of one or more of the operations may be repeated, combined, or reorganized to provide other methods. In portions of the following discussion, reference may be made to the environment 100 of FIG. 1, and entities detailed in FIGS. 1 through 6-3, reference to which is made for example only. The techniques are not limited to performance by one entity or multiple entities.

At 702, a selected parking space is identified among one or more available parking spaces in front of a host vehicle using sensor data obtained from one or more sensors of the host vehicle. For example, the parking system 112 or the parking space selector 114 can identify the selected parking space 512 from among the available spaces 108 in front of the vehicle 102. As described with respect to FIGS. 4 through 6-3, the parking system 112 or the parking space selector 114 can use the sensor data from the sensors 110 to identify the selected parking space 512. Alternatively, the user can identify the selected parking space 512 from among available spaces 108 using an interactive display in the vehicle 102.

The parking system 112 can identify the selected parking space 512 by determining, using the sensor data, whether multiple parking spaces are available in front of the vehicle 102. Parking-space characteristics of each available parking space can then be determined. The parking system 112 can then determine the selected parking space 512 based on the parking-space characteristics. Alternatively, the selected parking space 512 is identified by receiving a selection of the selected parking space 512 from a driver of the vehicle 102.

At 704, a lateral distance and a longitudinal distance associated with the selected parking space can be determined using the sensor data. The lateral distance indicates a distance between another vehicle in an adjacent parking space and the host vehicle in a lateral direction from the host vehicle. The longitudinal distance indicates a distance between the selected parking space and the host vehicle. For example, the parking system 112 can determine a lateral distance 210 and a longitudinal distance 206 associated with the selected parking space 512. As described in greater detail with respect to FIGS. 8-1 through 8-3, the lateral distance ($D_y$) and the longitudinal distance ($D_x$) can be defined and determined using the sensor data.

At 706, it can be determined whether the lateral distance and the longitudinal distance are greater than a minimum inner turning radius of the host vehicle. For example, the parking system 112 can determine whether the lateral distance ($D_y$) is greater than the minimum inner turning radius of the vehicle 102.

At 708, responsive to determining that the lateral distance and the longitudinal distance are greater than the minimum inner turning radius, the host vehicle is controlled, using an assisted-driving or autonomous-driving system, to park in the selected parking space using a single-turn maneuver. For example, the parking system 112 can determine an entry turning radius 204 for a single-turn maneuver in response to determining that the lateral distance 210 is greater than the minimum inner turning radius. The assisted-driving system 314 or the autonomous-driving system 316 can then control the vehicle 102 to park in the selected parking space 512 using the single-turn maneuver.

The parking system 112 can determine the entry turning radius 204 of the single-turn maneuver based on the longitudinal distance 206 and the lateral distance 210. If the longitudinal distance 206 and the lateral distance 210 are less than a configurable or optimal inner turning radius ($R_{2,opt}$), the entry turning radius 204 is a minimum of the lateral distance 210 and the longitudinal distance 206. The optimal inner turning radius ($R_{2,opt}$) can be pre-determined by the driver, the vehicle manufacturer, or the parking system 112. If the longitudinal distance 206 is less than the optimal inner turning radius ($R_{2,opt}$) and the lateral distance 210 is greater than or equal to the optimal inner turning radius ($R_{2,opt}$), the entry turning radius 204 is the longitudinal distance 206. If the longitudinal distance 206 is greater than or equal to the optimal inner turning radius ($R_{2,opt}$) and the lateral distance 210 is less than the optimal inner turning radius ($R_{2,opt}$), the entry turning radius 204 is the lateral distance. If the longitudinal distance 206 and the lateral distance 210 are greater than or equal to the optimal inner turning radius ($R_{2,opt}$), the entry turning radius 204 is the configurable or optimal inner turning radius ($R_{2,opt}$).

The parking system 112 can then determine whether the entry turning radius 204 of the single-turn maneuver is greater than the longitudinal distance 206. In response to determining that the entry turning radius 204 of the single-turn maneuver is greater than the longitudinal distance 206, the vehicle 102 can be controlled, using the assisted-driving system 314 or the autonomous-driving system 316, to drive a straight distance before performing the single-turn maneuver. The straight distance is approximately equal to the longitudinal distance 206 minus the entry turning radius 204 of the single-turn maneuver.

At 710, responsive to determining that the lateral distance is not greater than the minimum inner turning radius, it can be determined whether the longitudinal distance is greater than a longitudinal threshold. The longitudinal threshold is based on the minimum inner turning radius or the optimal inner turning radius ($R_{2,opt}$). The optimal inner turning radius ($R_{2,opt}$) is greater than the minimum inner turning radius. For example, the parking system 112 can determine whether the longitudinal distance 206 is greater than a longitudinal threshold in response to determining that the lateral distance is not greater than the minimum inner turning radius. In other words, the parking system 112 can determine whether a two-turn maneuver is available for controlling the vehicle 102 to park in the selected parking space 512.

The parking system 112 can use or define the longitudinal threshold in several ways, including using multiple longitudinal thresholds. For example, the parking system 112 can define a minimum turning radii threshold ($D_{thresh,R_{1,min},R_{2,min}}$), a configurable or optimal inner turning radius threshold ($D_{thresh,R_{1,min},R_{2,opt}}$), and a configurable or optimal turning radii threshold ($D_{thresh,R_{1,opt},R_{2,opt}}$). The minimum turning radii threshold is based on the minimum inner turning radius, a minimum outer turning radius, and the lateral distance 210. The minimum outer turning radius is approximately equal to a sum of the minimum inner turning radius and a rear track width of the vehicle 102. The optimal inner turning radius threshold is based on the optimal inner turning radius, the minimum outer turning radius, and the lateral distance 210. The optimal inner turning radius threshold is greater than the minimum turning radii threshold. The optimal turning radii threshold is based on the optimal inner turning radius, an optimal outer turning radius, and the lateral distance 210. The optimal outer turning radius is greater than the minimum outer turning radius and the optimal turning radii threshold is greater than the optimal inner turning radius threshold.

At 712, responsive to determining that the longitudinal distance is greater than the longitudinal threshold, the host vehicle is controlled, using the assisted-driving or autonomous-driving system, to park in the selected parking space using a two-turn maneuver. For example, the parking system 112 can determine a first turning radius ($R_1$) (e.g., away from the selected parking space 512) and second turning radius ($R_2$) (e.g., toward the selected parking space) for a two-turn maneuver in response to determining that the longitudinal distance 206 is greater than the longitudinal threshold. The assisted-driving system 314 or the autonomous-driving system 316 can then control the vehicle 102 to park in the selected parking space 512 using the two-turn maneuver.

If the longitudinal distance 206 is greater than or equal to the minimum turning radii threshold and less than the optimal inner turning radius threshold, the parking system 112 can apply the following settings. The parking system 112 can set the first turning radius ($R_1$) as the minimum outer turning radius and determine the second turning radius ($R_2$) based on the lateral distance 210, the longitudinal distance 206, and the first turning radius ($R_1$). If the longitudinal distance 206 is greater than or equal to the optimal inner turning radius threshold and less than the optimal turning radii threshold, the parking system 112 can apply different settings. The parking system 112 can set the second turning radius ($R_2$) as the optimal inner turning radius and determine the first turning radius ($R_1$) based on the lateral distance 210, the longitudinal distance 206, and the second turning radius ($R_2$). If the longitudinal distance 206 is greater than or equal to the optimal turning radii threshold, the parking system 112 can apply other, different settings. The parking system 112 can set the first turning radius ($R_1$) as the optimal outer turning radius and the second turning radius ($R_2$) as the optimal inner turning radius. In this situation, when applying these other, different settings, if the longitudinal distance 206 is greater than or equal to the optimal turning radii threshold, the parking system 112 can control, using the assisted-driving system 314 or the autonomous-driving system 316, the vehicle 106 to drive a straight distance before performing the two-turn maneuver. The straight distance is approximately equal to the longitudinal distance 206 minus the optimal turning radii threshold.

The parking system 112 can also determine whether the longitudinal distance 206 is greater than the minimum turning radii threshold and the lateral distance 210 is greater than the minimum inner turning radius but less than the optimal inner turning radius. In response to determining that the lateral distance 210 is greater than the minimum inner turning radius but less than the optimal inner turning radius and the longitudinal distance 206 is greater than the minimum turning radii threshold and less than the optimal inner turning radius threshold, the parking system 112 can set the first turning radius ($R_1$) as the minimum outer turning radius and determine the second turning radius ($R_2$) based on the lateral distance 210, the longitudinal distance 206, and the first turning radius ($R_1$). In response to determining that the longitudinal distance 206 is greater than the optimal inner turning radius threshold and less than the optimal turning radii threshold, the parking system 112 can set the second turning radius ($R_2$) as the optimal inner turning radius and determine the first turning radius ($R_1$) based on the lateral distance 210, the longitudinal distance 206, and the second turning radius ($R_2$). In response to determining that the longitudinal distance 206 is greater than or equal to the optimal turning radii threshold, the parking system 112 can set the first turning radius ($R_1$) as the optimal outer turning radius and the second turning radius ($R_2$) as the optimal inner turning radius. The parking system 112 can also control, using the assisted-driving system 314 or the autonomous-driving system 316, the vehicle 102 to drive a straight distance before performing the two-turn maneuver. The straight distance is approximately equal to the longitudinal distance 206 minus the optimal turning radii threshold.

The single-turn maneuver and the two-turn maneuver can be front-in parking maneuvers. In other implementations, the single-turn maneuver and the two-turn maneuver can be a back-in parking maneuver that approximately mirrors a front-in parking maneuver for a parking space opposite the selected parking space 512.

Figures 1, 8:
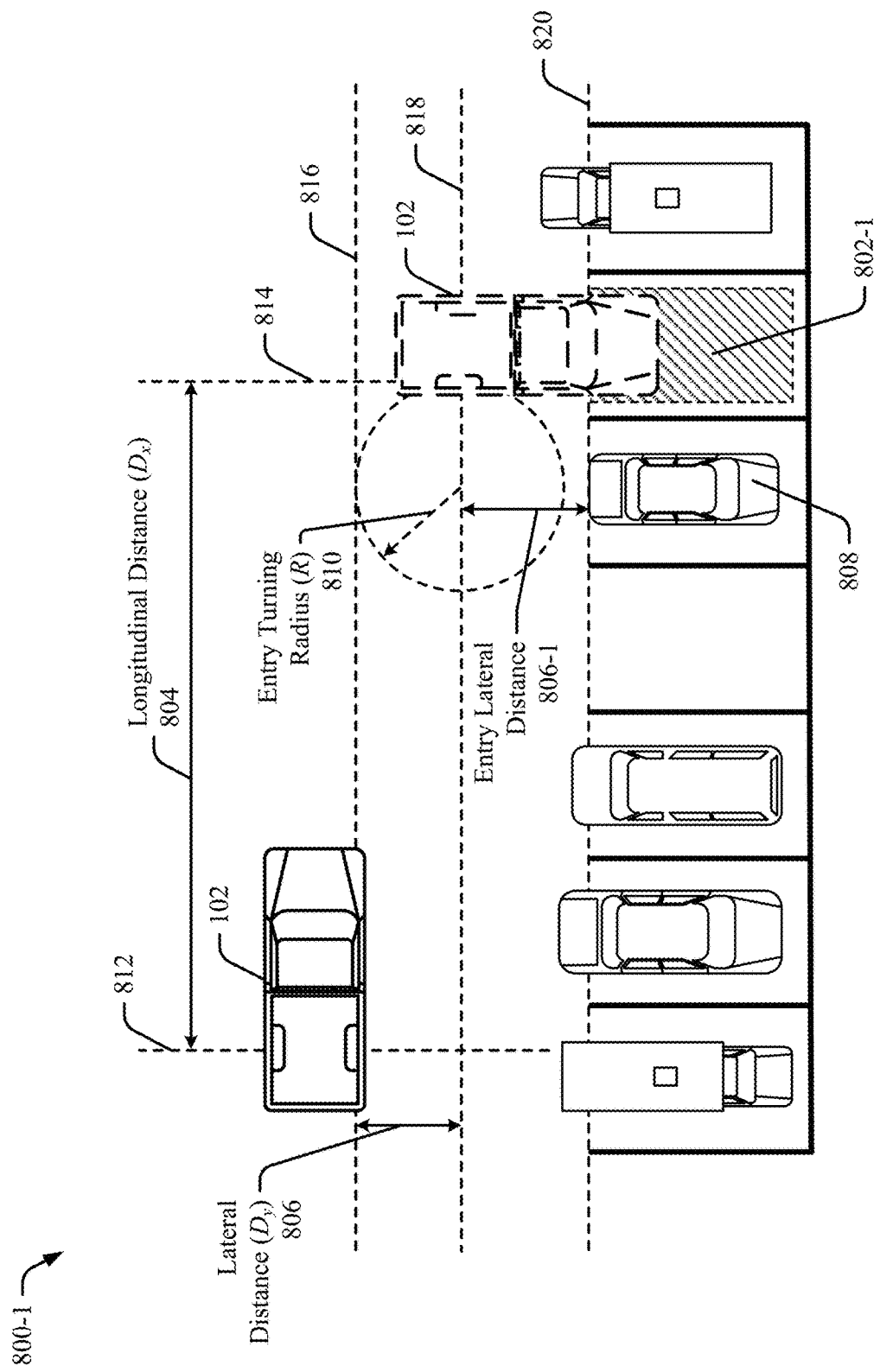
Figures 2, 8:
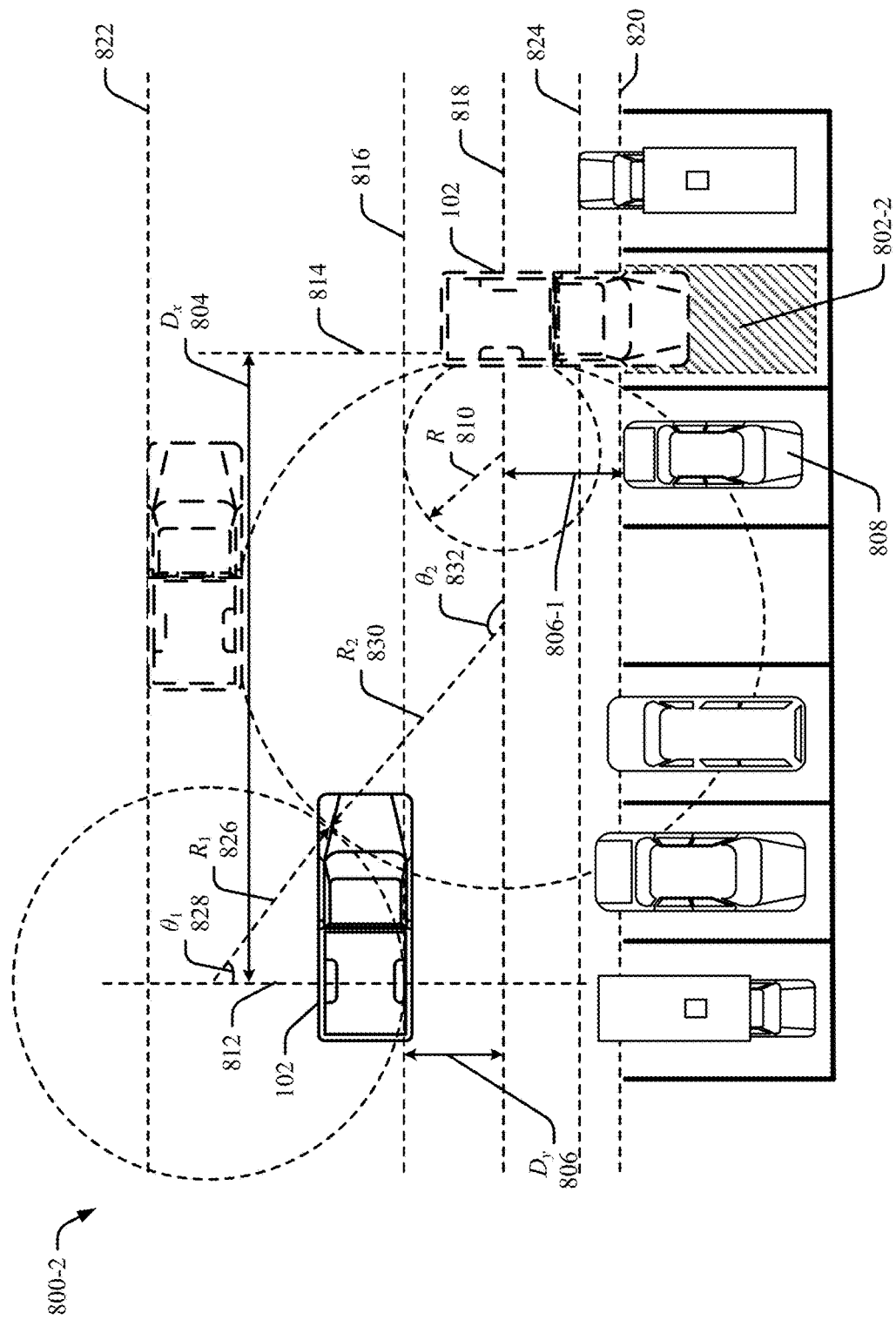
Figures 3, 8:
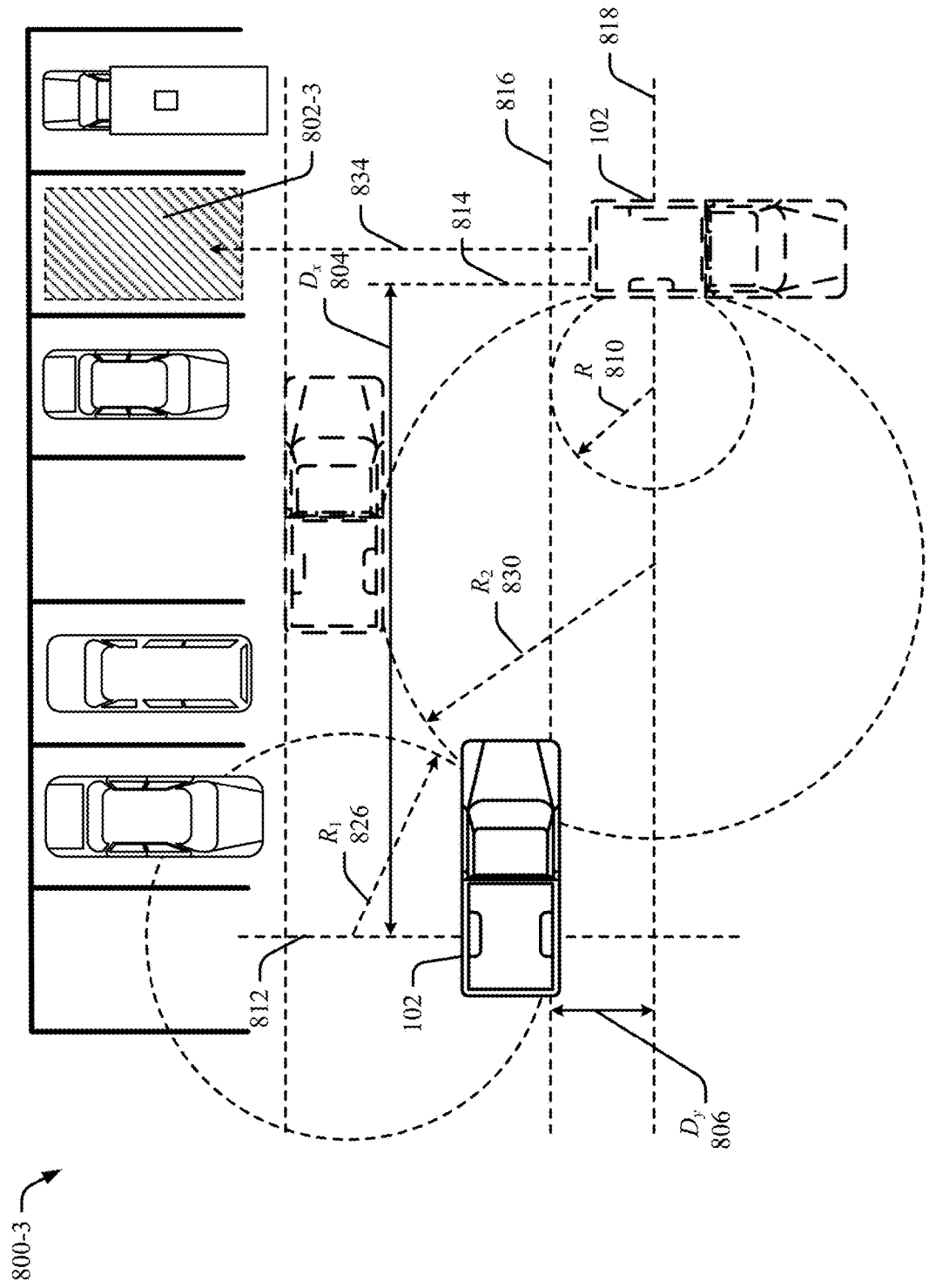

FIG. 8-1 illustrates an example environment 800-1 in which a parking system can perform a single-turn maneuver for a selected parking space 802-1. In the illustrated environment 800-1, a vehicle (e.g., the vehicle 102) is in a parking environment (e.g., a parking lot at a grocery store) with several available spaces. The parking system 112 can select the selected parking space 802-1 using the method described above with respect to FIGS. 1 through 6-3. Alternatively, the driver of the vehicle 102 can select the selected parking space 802-1 via an input device (e.g., a display) that identifies the available spaces.

The parking system 112 can determine a longitudinal distance 804 ($D_x$) and a lateral distance 806 ($D_y$) associated with the selected parking space 802-1. The longitudinal distance 804 ($D_x$) and the lateral distance 806 ($D_y$) can be determined using the sensor data from the sensors 110.

The longitudinal distance 804 ($D_x$) indicates a distance between the selected parking space 802-1 and the vehicle 102 (e.g., at a stopped position). If the vehicle 102 is still moving, the longitudinal distance 804 ($D_x$) is generally determined as the distance from a stopped position of the vehicle 102 to the selected parking space 802-1. For example, the parking system 112 can define the longitudinal distance 804 ($D_x$) as the distance from (a) the rear axle (e.g., represented by line 812) of the vehicle 102 at the current position to (b) the inside edge of the rear axle (e.g., represented by line 814) of the vehicle 102 when centered in the selected parking space 802-1. In other implementations, the parking system 112 can define the longitudinal distance 804 ($D_x$) using different reference points.

The lateral distance 806 ($D_y$) indicates a distance between another vehicle 808 in an adjacent parking space and the vehicle 102 in a lateral direction. For example, the parking system 112 can define the lateral distance 806 ($D_y$) using an entry lateral distance 806-1. The entry lateral distance 806-1 can represent the lateral distance required to enter the selected parking space 802-1 without a collision with a vehicle parked in an adjacent parking space. As a result, the entry lateral distance 806-1 is generally based on a width associated with the selected parking space 802-1, a width between vehicles parked in the adjacent parking spaces, or an offset of a vehicle in the further adjacent parking space and the edge of the parking space. The lateral distance 806 ($D_y$) can be defined as the distance between (a) the rear tire of the vehicle 102 nearest the selected parking space 802-1 (e.g., represented by line 816) and (b) the entry lateral distance 806-1 (e.g., represented by the line 818). In other implementations, the parking system 112 can define the lateral distance 806 ($D_y$) using different reference points.

The parking system 112 can then determine whether the longitudinal distance 804 ($D_x$) and the lateral distance 806 ($D_y$) are greater than the minimum inner turning radius ($R_{2,min}$) of the vehicle 102. As a reference, the minimum outer turning radius ($R_{1,min}$) is approximately equal to the minimum inner turning radius ($R_{2,min}$) plus the width of the rear track or axle. If the minimum inner turning radius ($R_{2,min}$) of the vehicle 102 is less than both the longitudinal distance 804 ($D_x$) and the lateral distance 806 ($D_y$), the parking system 112 can determine a single-turn maneuver to park the vehicle 102 in the selected parking space 802-1. The single-turn maneuver includes an entry turning radius 810 (R). The parking system 112 can determine the entry turning radius 810 (R) as the minimum of the longitudinal distance 804 ($D_x$) and the lateral distance 806 ($D_y$), which is represented by Equation (3):

$$R = \min(D_x, D_y) \qquad \text{Equation (3)}$$

In some implementations, a configurable or optimal outer turning radius ($R_{1,opt}$) and a configurable or optimal inner turning radius ($R_{2,opt}$) can be defined as turning radii to complete a safe and comfortable turning maneuver. The optimal outer turning radius ($R_{1,opt}$) and the optimal inner turning radius ($R_{2,opt}$) can be pre-determined by the parking system 112, pre-determined by the vehicle manufacturer, or driver selected. The optimal outer turning radius ($R_{1,opt}$) and the optimal inner turning radius ($R_{2,opt}$) are greater than the minimum outer turning radius ($R_{1,min}$) and the minimum inner turning radius ($R_{2,min}$), respectively.

In such implementations, if the longitudinal distance 804 ($D_x$) is greater than the optimal inner turning radius ($R_{2,opt}$) and the lateral distance 806 ($D_y$) is less than the optimal inner turning radius ($R_{2,opt}$), the parking system 112 can set the entry turning radius 810 (R) as the lateral distance 806 ($D_y$), which is represented by Equation (4):

$$\text{if } D_x > R_{2,opt} \text{ and } R_{2,min} < D_y < R_{2,opt}, \text{ then } R = D_y \qquad \text{Equation (4)}$$

If the lateral distance 806 ($D_y$) is greater than the optimal inner turning radius ($R_{2,opt}$) and the longitudinal distance 804 ($D_x$) is less than the optimal inner turning radius ($R_{2,opt}$), the parking system 112 can select the entry turning radius 810 (R) as the longitudinal distance 804 ($D_x$), which is represented by Equation (5):

$$\text{if } D_y > R_{2,opt} \text{ and } R_{2,min} < D_x < R_{2,opt}, \text{ then } R = D_x \qquad \text{Equation (5)}$$

If the lateral distance 806 ($D_y$) and the longitudinal distance 804 ($D_x$) are both greater than the optimal inner turning radius ($R_{2,opt}$), the parking system 112 can select the entry turning radius 810 (R) as the optimal inner turning radius ($R_{2,opt}$), which is represented by Equation (6):

$$\text{if } D_y > R_{2,opt} \text{ and } D_x > R_{2,opt}, \text{ then } R = R_{2,opt} \qquad \text{Equation (6)}$$

FIG. 8-2 illustrates an example environment 800-2 in which a parking system can perform a two-turn maneuver for a selected parking space 802-2. In the illustrated environment 800-2, a vehicle (e.g., the vehicle 102) is in a parking environment (e.g., a parking lot at a grocery store) with several available spaces. The parking system 112 can select the selected parking space 802-2 using the method described above with respect to FIGS. 1 through 6-3. Alternatively, the driver of the vehicle 102 can select the selected parking space 802-2 via an input device (e.g., a display) that identifies the available spaces.

The environment 800-2 includes effective road boundaries represented by lines 822 and 824. The lines 822 and 824 provide an offset or safety distance between the parking spaces 104 and the vehicles therein and the vehicle 102.

As described with respect to FIG. 8-1, the parking system 112 can determine a longitudinal distance 804 ($D_x$) and a lateral distance 806 ($D_y$) associated with the selected parking space 802-2. The longitudinal distance 804 ($D_x$) and the lateral distance 806 ($D_y$) can be determined using the sensor data from the sensors 110.

The parking system 112 can then determine whether the longitudinal distance 804 (D and the lateral distance 806 ($D_y$) are greater than the minimum inner turning radius ($R_{2,min}$) of the vehicle 102. If the minimum inner turning radius ($R_{2,min}$) of the vehicle 102 is greater than the lateral distance 806 ($D_y$), the vehicle 102 is unable to park in the selected parking space 802-2 using a single-turn maneuver. The parking system 112 can, however, determine whether a two-turn maneuver is available to park the vehicle 102 in the selected parking space 802-2. The two-turn maneuver includes a first turning radius 826 ($R_1$) and a second turning radius 830 ($R_2$).

The first turning radius 826 ($R_1$) and the line 812 define a first angle 828 ($\theta_1$). The second turning radius 830 ($R_2$) and the line 818 define a second angle 832 ($\theta_2$), where the second angle 832 ($\theta_2$) is equal to the first angle 828 ($\theta_1$) plus 90 degrees (e.g., $\theta_2=\theta_1+90°$). It is noted that the first turning radius 826 ($R_1$), the second turning radius 830 ($R_2$), the lateral distance 806 ($D_y$), and the longitudinal distance 804 ($D_x$) define a right triangle with (a) a first side equal to the sum of the first turning radius 826 ($R_1$) and the lateral distance 806 ($D_y$), (b) a second side equal to the longitudinal distance 804 ($D_x$) minus the second turning radius 830 ($R_2$), and (c) a hypotenuse equal to the sum of the first turning radius 826 ($R_1$) and the second turning radius 830 ($R_2$). As a result, the cosine and sine of the first angle 828 ($\theta_1$) is represented by Equations (7) and (8), respectively:

$$\cos\theta_1 = \frac{R_1 + D_y}{R_1 + R_2} \quad \text{Equation (7)}$$

$$\sin\theta_1 = \frac{D_x - R_2}{R_1 + R_2} \quad \text{Equation (8)}$$

Using the Pythagorean Equation, the relationship between the first turning radius 826 ($R_1$), the second turning radius 830 ($R_2$), the lateral distance 806 ($D_y$), and the longitudinal distance 804 ($D_x$) can be represented by Equations (9) and (10):

$$\frac{(D_x - R_2)^2 + (R_1 + D_y)^2}{(R_1 + R_2)^2} = 1 \quad \text{Equation (9)}$$

$$2R_1R_2 - 2R_1D_y + 2R_2D_x - D_x^2 - D_y^2 = 0 \quad \text{Equation (10)}$$

If the parking system 112 determines, selects, or pre-defines the value of the first turning radius 826 ($R_1$) or the second turning radius 830 ($R_2$), the other turning radius value, the first angle 828 ($\theta_1$), and the second angle 832 ($\theta_2$) can be determined using Equations (7), (8), (9), and/or (10).

If the value of both the first turning radius 826 ($R_1$) and the second turning radius 830 ($R_2$) are determined, selected, or pre-defined, a longitudinal threshold ($D_{x,thresh}$) can be determined using Equation (11):

$$D_{x,thresh} = \sqrt{(R_1+R_2)^2-(R_1+D_y)^2}+R_2 \quad \text{Equation (11)}$$

In response to determining that the lateral distance 806 ($D_y$) is not greater than the minimum inner turning radius ($R_{2,min}$), the parking system 112 can determine whether the longitudinal distance 804 ($D_x$) is greater than the longitudinal threshold ($D_{x,thresh}$). As reflected in Equation (11), the longitudinal threshold ($D_{x,thresh}$) can be based on the first turning radius ($R_1$), the second turning radius ($R_2$), and the lateral distance 806 ($D_y$). The parking system 112 can, for example, define several different potential longitudinal thresholds ($D_{x,thresh}$), including a minimum turning radii threshold ($D_{thresh,R_{1,min},R_{2,min}}$) a configurable or optimal inner turning radius threshold ($D_{thresh,R_{1,min},R_{2,opt}}$), and/or a configurable or optimal turning radii threshold ($D_{thresh,R_{1,opt},R_{2,opt}}$).

If the parking system 112 uses the minimum turning radii threshold ($D_{thresh,R_{1,min},R_{2,min}}$), then the longitudinal threshold ($D_{x,thresh}$) is calculated using Equation (12):

$$D_{x,thresh}=D_{thresh,R_{1,min},R_{2,min}}=\sqrt{(R_{1,min}+R_{2,min})^2-(R_{1,min}+D_y)^2}+R_{2,min} \quad \text{Equation (12)}$$

If the lateral distance 806 ($D_y$) is greater than or equal to the minimum inner turning radius ($R_{2,min}$) of the vehicle 102, a single-turn maneuver or a two-turn maneuver is an option to park in the selected parking space 802-2. In some implementations, the single-turn maneuver can be preferred in such situations. If the lateral distance 806 ($D_y$) is less than the minimum inner turning radius ($R_{2,min}$) of the vehicle 102, a single-turn maneuver is not an available option, but a two-turn maneuver is available as discussed above (e.g., $D_x > D_{thresh,R_{1,min},R_{2,min}}$). In particular, the first turning radius 826 ($R_1$) can be set equal to the minimum outer turning radius and the second turning radius 830 ($R_2$) can be determined using Equation (9) or (10). Alternatively, the parking system 112 can set the second turning radius 830 ($R_2$) equal to the minimum inner turning radius ($R_{2,min}$) and determine the first turning radius 826 ($R_1$) using Equation (9) or (10). In addition, if the longitudinal distance 804 ($D_x$) is less than the minimum turning radii threshold ($D_{thresh,R_{1,min},R_{2,min}}$), a two-turn maneuver is not an available option.

If the parking system 112 uses the optimal inner turning radius threshold ($D_{thresh,R_{1,min},R_{2,opt}}$), then the longitudinal threshold ($D_{x,thresh}$) is calculated using Equation (13):

$$D_{x,thresh}=D_{thresh,R_{1,min},R_{2,opt}}=\sqrt{(R_{1,min}+R_{2,opt})^2-(R_{1,min}+D_y)^2}+R_{2,opt} \quad \text{Equation (13)}$$

If the lateral distance 806 ($D_y$) is greater than or equal to the optimal inner turning radius ($R_{2,opt}$), a single-turn maneuver or a two-turn maneuver is an option to park in the selected parking space 802-2. In some implementations, the single-turn maneuver can be preferred in such situations. In particular, if the longitudinal distance 804 ($D_x$) is greater than or equal to the optimal inner turning radius threshold ($D_{thresh,R_{1,min},R_{2,opt}}$) the second turning radius 830 ($R_2$) can be set equal to the optimal inner turning radius ($R_{2,opt}$) and the first turning radius 826 ($R_1$) can be determined using Equation (9) or (10). Alternatively, if the longitudinal distance 804 ($D_x$) is greater than or equal to the minimum turning radii threshold ($D_{thresh,R_{1,min},R_{2,min}}$) but less than the optimal inner turning radius threshold ($D_{thresh,R_{1,min},R_{2,opt}}$), the parking system 112 can set the first turning radius 826 ($R_1$) equal to the outer turning radius ($R_{1,min}$) and determine the second turning radius 830 ($R_2$) using Equation (9) or (10).

If the parking system 112 uses the optimal turning radii threshold ($D_{thresh,R_{1,opt},R_{2,opt}}$), then the longitudinal threshold ($D_{x,thresh}$) is calculated using Equation (14):

$$D_{x,thresh}=D_{thresh,R_{1,opt},R_{2,opt}}=\sqrt{(R_{1,opt}+R_{2,opt})^2-(R_{1,opt}+D_y)^2}+R_{2,opt} \quad \text{Equation (14)}$$

If the lateral distance 806 ($D_y$) is greater than or equal to the optimal inner turning radius ($R_{2,opt}$), a single-turn maneuver or a two-turn maneuver is an option to park in the selected parking space 802-2. In some implementations, the single-turn maneuver can be preferred in such situations. If the longitudinal distance 804 ($D_x$) is greater than or equal to the optimal turning radii threshold ($D_{thresh,R_{1,opt},R_{2,opt}}$), the second turning radius 830 ($R_2$) and the first turning radius 826 ($R_1$) are set equal to the optimal inner turning radius ($R_{2,opt}$) and the optimal outer turning radius ($R_{1,opt}$), respectively. In such a situation, a longitudinal straight distance ($D_{straight}$) is needed, which can be calculated using Equation (15):

$$D_{straight} = D_x - D_{thresh,R_{1,opt},R_{2,opt}} \quad \text{Equation (15)}$$

FIG. 8-3 illustrates an example environment 800-3 in which a parking system can perform a two-turn maneuver to park back-in into a selected parking space 802-3. In the illustrated environment 800-3, a vehicle (e.g., the vehicle 102) is in a parking environment (e.g., a parking lot at a grocery store) with several available spaces. The parking system 112 can select the selected parking space 802-3 using the method described above with respect to FIGS. 1 through 6-3. Alternatively, the driver of the vehicle 102 can select the selected parking space 802-3 via an input device (e.g., a display) that identifies the available spaces.

As described with respect to FIGS. 8-1 and 8-2, the parking system 112 can determine a longitudinal distance 804 ($D_x$) and a lateral distance 806 ($D_y$) associated with the selected parking space 802-3. The longitudinal distance 804 ($D_x$) and the lateral distance 806 ($D_y$) can be determined using the sensor data from the sensors 110. Based on the longitudinal distance 804 ($D_x$) and the lateral distance 806 ($D_y$), the parking system 112 can then determine whether a single-turn or two-turn maneuver is appropriate to park in the selected parking space 802-3, as described with respect to FIGS. 8-1 and 8-2.

In some situations, back-in parking is preferred. For example, the driver can select via an input device to back into the selected parking space 802-3, the driver can configure the parking system 112 to back-in park when available, or the parking system 112 can determine that back-in parking is required in the environment 800-3. The back-in parking maneuver begins with a single-turn or two-turn parking maneuver for a parking space opposite the selected parking space 802-3 followed by a straight reverse maneuver 834 into the selected parking space 802-3.

Figure 9:
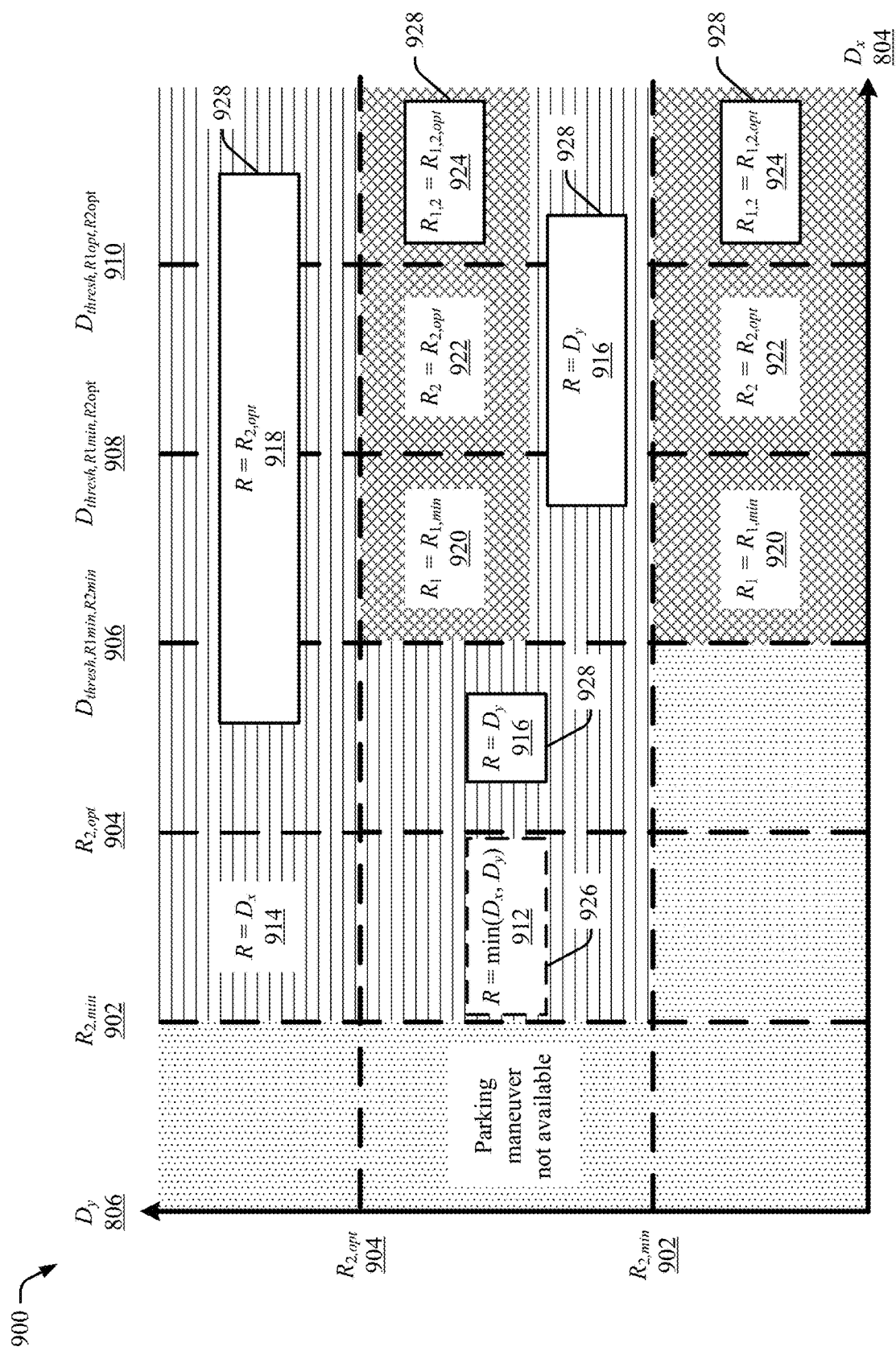
FIG. 9 illustrates an example graph representing available parking maneuvers to park in a selected parking space.

FIG. 9 illustrates an example graph 900 representing available parking maneuvers to park in a selected parking space. For the illustrated graph 900, a vehicle (e.g., the vehicle 102) is in a parking environment (e.g., a parking lot at a grocery store) and one of the available spaces 108 has been identified as the selected parking space (e.g., the selected parking space 802-1, 802-2, or 802-3). The parking system 112 can select the selected parking space 802 using the method described above with respect to FIGS. 1 through 6-3. Alternatively, the driver of the vehicle 102 can select the selected parking space 802 via an input device (e.g., a display) that identifies the available spaces.

The graph 900 includes the longitudinal distance 804 ($D_x$) as a first axis and the lateral distance 806 ($D_y$) as a second axis. The first axis is subdivided by an minimum inner turning radius 902 ($R_{2,min}$), optimal inner turning radius 904 ($R_{2,opt}$), minimum turning radii threshold 906 ($D_{thresh,R_{1,min},R_{2,min}}$), optimal inner turning radius threshold 908 ($D_{thresh,R_{1,min},R_{2,opt}}$), and optimal turning radii threshold 910 ($D_{thresh,R_{1,opt},R_{2,opt}}$). The second axis is subdivided by the minimum inner turning radius 902 ($R_{2,min}$) and the optimal inner turning radius 904 ($R_{2,opt}$).

As described with respect to FIGS. 8-1 and 8-2, the parking system 112 can determine the longitudinal distance 804 ($D_x$) and the lateral distance 806 ($D_y$) associated with the selected parking space 802. Based on the longitudinal distance 804 ($D_x$) and the lateral distance 806 ($D_y$), the parking system 112 can then determine whether a single-turn or two-turn maneuver is appropriate to park in the selected parking space 802, as described with respect to FIGS. 8-1 and 8-2.

If the longitudinal distance 804 ($D_x$) is less than the minimum inner turning radius 902 ($R_{2,min}$), a parking maneuver is not available, which is represented by the dotted fill pattern, and another available space 108 is identified as the selected parking space 802. If the lateral distance 806 ($D_y$) is less than the minimum inner turning radius 902 ($R_{2,min}$) and the longitudinal distance 804 ($D_x$) is less than the minimum turning radii threshold 906 ($D_{thresh,R_{1,min},R_{2,min}}$), a parking maneuver is not available and another available space 108 is identified as the selected parking space 802.

If the longitudinal distance 804 ($D_x$) is less than the minimum turning radii threshold 906 ($D_{thresh,R_{1,min},R_{2,min}}$) and the lateral distance 806 ($D_y$) is greater than or equal to the minimum inner turning radius 902 ($R_{2,min}$), a single-turn maneuver is available. In FIG. 9, single-turn maneuvers are represented by a horizontal-line fill pattern. In particular, if the longitudinal distance 804 ($D_x$) is less than the optimal inner turning radius 904 ($R_{2,opt}$) and the lateral distance 806 ($D_y$) is greater than or equal to the minimum inner turning radius 902 ($R_{2,min}$) but less than the optimal inner turning radius 904 ($R_{2,opt}$), the parking system 112 can perform a single-turn maneuver 912 with the entry turning radius 810 (R) set equal to a minimum of the longitudinal distance 804 ($D_x$) and the lateral distance 806 ($D_y$). Depending on the entry turning radius 810, the parking system 112 may need to operate the vehicle 102 to drive straight ahead before performing the single-turn maneuver, which is represented by the dashed line 926.

If the longitudinal distance 804 ($D_x$) is less than the optimal inner turning radius 904 ($R_{2,opt}$) and the lateral distance 806 ($D_y$) is greater than or equal to the optimal inner turning radius 904 ($R_{2,opt}$), the parking system 112 can perform a single-turn maneuver 914 with the entry turning radius 810 (R) set equal to the longitudinal distance 804 ($D_x$). If the longitudinal distance 804 ($D_x$) is less than the minimum turning radii threshold 906 ($D_{thresh,R_{1,min},R_{2,min}}$) but greater than or equal to the optimal inner turning radius 904 ($R_{2,opt}$) and the lateral distance 806 ($D_y$) is greater than or equal to the minimum inner turning radius 902 ($R_{2,min}$) but less than the optimal inner turning radius 904 ($R_{2,opt}$), the parking system 112 can perform a single-turn maneuver 916 with the entry turning radius 810 (R) set equal to the lateral distance 806 ($D_y$). Because the longitudinal distance 804 ($D_x$) is greater than the entry turning radius 810, the parking system 112 operates the vehicle 102 to drive straight ahead before performing the single-turn maneuver, which is represented by a solid line 928.

If the longitudinal distance 804 ($D_x$) is less than the minimum turning radii threshold 906 ($D_{thresh,R_{1,min},R_{2,min}}$) but greather than or equal to the optimal inner turning radius 904 ($R_{2,opt}$) and the lateral distance 806 ($D_y$) is greater than or equal to the optimal inner turning radius 904 ($R_{2,opt}$), the parking system 112 can perform a single-turn maneuver 918 with the entry turning radius 810 (R) set equal to the optimal inner turning radius 904 ($R_{2,opt}$). Similarly, if the longitudinal distance 804 ($D_x$) is greater than or equal to the optimal inner turning radius 904 ($R_{2,opt}$) and the lateral distance 806 ($D_y$) is greater than or equal to the optimal inner turning radius 904 ($R_{2,opt}$), the parking system 112 can perform the single-turn maneuver 918 even if a two-turn maneuver is available (e.g., $D_x > D_{thresh,R_{1,min},R_{2,min}}$). Because the longitudinal distance 804 ($D_x$) is greater than the entry turning radius 810, the parking system 112 operates the vehicle 102 to drive straight ahead before performing the single-turn maneuver, which is represented by the solid line 928.

If the longitudinal distance 804 ($D_x$) is greater than or equal to the minimum turning radii threshold 906 ($D_{thresh,R_{1,min},R_{2,min}}$) and the lateral distance 806 ($D_y$) is less than the minimum inner turning radius 902 ($R_{2,min}$), a single-turn maneuver is not available, but a two-turn maneuver is available. In FIG. 9, two-turn maneuvers are represented by a crosshatch fill pattern. In particular, if the longitudinal distance 804 ($D_x$) is greater than or equal to the minimum turning radii threshold 906 ($D_{thresh,R_{1,min},R_{2,min}}$) but less than the optimal inner turning radius threshold 908 ($D_{thresh,R_{1,min},R_{2,opt}}$) and the lateral distance 806 ($D_y$) is less than the minimum inner turning radius 902 ($R_{2,min}$), the parking system 112 can perform a two-turn maneuver 920 with the first turning radius 826 ($R_1$) set equal to the minimum outer turning radius ($R_{1,min}$). If the longitudinal distance 804 ($D_x$) is greater than or equal to the optimal inner turning radius threshold 908 ($D_{thresh,R_{1,min},R_{2,opt}}$) but less than the optimal turning radii threshold 910 ($D_{thresh,R_{1,opt},R_{2,opt}}$) and the lateral distance 806 ($D_y$) is less than the inner turning radius 902 ($R_{2,min}$), the parking system 112 can perform a two-turn maneuver 922 with the second turning radius 830 ($R_2$) set equal to the optimal inner turning radius 904 ($R_{2,opt}$). If the longitudinal distance 804 ($D_x$) is greater than or equal to the optimal turning radii threshold 910 ($D_{thresh,R_{1,opt},R_{2,opt}}$) and the lateral distance 806 ($D_y$) is less than the minimum inner turning radius 902 ($R_{2,min}$), the parking system 112 can perform a two-turn maneuver 924 with the first turning radius 826 ($R_1$) and the second turning radius 830 ($R_2$) set equal to the optimal outer turning radius ($R_{1,opt}$) and the optimal inner turning radius 904 ($R_{2,opt}$), respectively. Because the longitudinal distance 804 ($D_x$) is greater than the sum of the optimal outer turning radius ($R_{1,opt}$) and the optimal inner turning radius 904 ($R_{2,opt}$), the parking system 112 operates the vehicle 102 to drive straight ahead before performing the two-turn maneuver 924, which is represented by the solid line 928.

If the longitudinal distance 804 ($D_x$) is greater than or equal to the minimum turning radii threshold 906 ($D_{thresh,R_{1,min},R_{2,min}}$) and the lateral distance 806 ($D_y$) is greater than or equal to the minimum inner turning radius 902 ($R_{2,min}$) but less than the optimal inner turning radius 904 ($R_{2,opt}$), both a single-turn maneuver and a two-turn maneuver are available. For example, the parking system 112 can perform the single-turn maneuver 916 as described above. Depending on the longitudinal distance 804 ($D_x$), the parking system 112 can perform the two-turn maneuver 920, 922, or 924 as described above. In this scenario, the parking system 112 may determine a two-turn maneuver is preferred because the second turning radius 830 ($R_2$) is greater than the entry turning radius 810 (R). In other implementations, the parking system 112 may determine the single-turn maneuver 916 is preferred based on driver preferences or another reason.

If the longitudinal distance 804 ($D_x$) is greater than or equal to the minimum turning radii threshold 906 ($D_{thresh,R_{1,min},R_{2,min}}$) and the lateral distance 806 ($D_y$) is greater than or equal to the optimal inner turning radius 904 ($R_{2,opt}$), both a single-turn maneuver and a two-turn maneuver are available. For example, the parking system 112 can perform the single-turn maneuver 918 as described above. Depending on the longitudinal distance 804 ($D_x$), the parking system 112 can perform the two-turn maneuver 920, 922, or 924 as described above. In this scenario, the parking system 112 may determine the single-turn maneuver 918 is preferred because the entry turning radius 810 (R) is set equal to the optimal inner turning radius 904 ($R_{2,opt}$).

EXAMPLES

In the following section, examples are provided.

Example 1. A method comprising: determining, using sensor data obtained from one or more sensors of a host vehicle, whether multiple parking spaces are available in front of the host vehicle; determining, using the sensor data, parking-space characteristics of each available parking space of the multiple parking spaces, the parking-space characteristics including a width, an entry turning radius, and a longitudinal distance to the available parking space; determining a selected parking space among the multiple parking spaces based on the parking-space characteristics; and controlling, using an assisted-driving or autonomous-driving system, operation of the host vehicle to park in the selected parking space.

Example 2. The method of Example 1, wherein the one or more sensors include at least one of radar systems, lidar systems, ultrasonic systems, or vision-based systems.

Example 3. The method of any one of the preceding examples, wherein determining whether multiple parking spaces are available in front of the host vehicle is also based on data obtained from external sensors, the external sensors including at least one of infrastructure sensors, drone-based sensors, or sensors installed on other vehicles near the host vehicle.

Example 4. The method of any one of the preceding examples, wherein the parking-space characteristics include at least one of a space depth, space type, neighboring vehicle classification, or shading classification.

Example 5. The method of Example 4, wherein at least one of the parking-space characteristics are configurable based on driver preferences for the selected parking space.

Example 6. The method of any one of the preceding examples, wherein the selected parking space is determined using conditional probability distributions for the parking-space characteristics.

Example 7. The method of Example 6, wherein the selected parking space is determined using an application of Bayesian theorem to the conditional probability distributions for the parking-space characteristics.

Example 8. The method of any one of the preceding examples, wherein the selected parking space is determined using a machine-learned model, a reinforced learning model, or a deep learning model that is configured to receive the sensor data as input to infer the parking-space characteristics used to determine the selected parking space.

Example 9. The method of any one of the preceding examples, wherein the multiple parking spaces are approximately perpendicular or at an angle to a travel path of the host vehicle.

Example 10. The method of any one of the preceding examples, wherein the multiple parking spaces are approximately parallel to a travel path of the host vehicle.

Example 11. The method of any one of the preceding examples, wherein controlling the host vehicle to park in the selected parking space comprises performing a front-in parking maneuver.

Example 12. The method of Example 11, wherein the front-in parking maneuver includes a two-turn maneuver path.

Example 13. The method of any one of the preceding examples, wherein controlling the host vehicle to park in the selected parking space comprises performing a back-in parking maneuver, the back-in parking maneuver approximately mirroring a front-in parking maneuver for a parking space opposite the selected parking space.

Example 14. A system comprising one or more processors configured to perform the method of any one of the preceding examples.

Example 15. A computer-readable storage media comprising computer-executable instructions that, when executed, cause a processor to perform the method of any one of Examples 1 through 13.

Example 16. A method comprising: identifying, using sensor data obtained from one or more sensors of a host vehicle, a selected parking space among one or more available parking spaces in front of the host vehicle; determining, using the sensor data, a lateral distance and a longitudinal distance associated with the selected parking space, the lateral distance indicating a distance between another vehicle in an adjacent parking space and the host vehicle in a lateral direction from the host vehicle, the longitudinal distance indicating a distance between the selected parking space and the host vehicle; determining whether the lateral distance and the longitudinal distance are greater than a minimum inner turning radius of the host vehicle; and responsive to determining that the lateral distance and the longitudinal distance are greater than the minimum inner turning radius, controlling, using an assisted-driving or autonomous-driving system, the host vehicle to park in the selected parking space using a single-turn maneuver; or responsive to determining that the lateral distance is not greater than the minimum inner turning radius: determining whether the longitudinal distance is greater than a longitudinal threshold, the longitudinal threshold being based on the minimum inner turning radius or a configurable inner turning radius of the host vehicle, the configurable inner turning radius being greater than the minimum inner turning radius; and responsive to determining that the longitudinal distance is greater than the longitudinal threshold, controlling, using the assisted-driving or the autonomous-driving system, the host vehicle to park in the selected parking space using a two-turn maneuver.

Example 17. The method of Example 16, wherein an entry turning radius of the single-turn maneuver comprises: if the longitudinal distance and the lateral distance are less than the configurable inner turning radius, a minimum of the lateral distance and the longitudinal distance; if the longitudinal distance is less than the configurable inner turning radius and the lateral distance is greater than or equal to the configurable inner turning radius, the longitudinal distance; if the longitudinal distance is greater than or equal to the configurable inner turning radius and the lateral distance is less than the configurable inner turning radius, the lateral distance; or if the longitudinal distance and the lateral distance are greater than or equal to the configurable inner turning radius, the configurable inner turning radius.

Example 18. The method of Example 18, the method further comprising: determining whether the entry turning radius of the single-turn maneuver is greater than the longitudinal distance; and responsive to determining that the entry turning radius of the single-turn maneuver is greater than the longitudinal distance, controlling, using the assisted-driving or the autonomous-driving system, the host vehicle to drive a straight distance before performing the single-turn maneuver, the straight distance being approximately equal to the longitudinal distance minus the entry turning radius of the single-turn maneuver.

Example 19. The method of any one of Examples 15 through 18, wherein the longitudinal threshold comprises at least one of: a minimum turning radii threshold, the minimum turning radii threshold being based on the minimum inner turning radius, a minimum outer turning radius, and the lateral distance, the minimum outer turning radius being approximately equal to a sum of the minimum inner turning radius and a rear track width of the host vehicle; a configurable inner turning radius threshold, the configurable inner turning radius threshold being based on the configurable inner turning radius, the minimum outer turning radius, and the lateral distance, the configurable inner turning radius threshold being greater than the minimum turning radii threshold; or a configurable turning radii threshold, the configurable turning radii threshold being based on the configurable inner turning radius, a configurable outer turning radius, and the lateral distance, the configurable outer turning radius being greater than the minimum outer turning radius, the configurable turning radii threshold being greater than the configurable inner turning radius threshold.

Example 20. The method of Example 19, wherein: the two-turn maneuver comprises a first turning radius away from the selected parking space followed by a second turning radius toward the selected parking space; and if the longitudinal distance is greater than or equal to the minimum turning radii threshold and less than the configurable inner turning radius threshold, the first turning radius comprises the minimum outer turning radius and the second turning radius is determined based on the lateral distance, the longitudinal distance, and the first turning radius; if the longitudinal distance is greater than or equal to the configurable inner turning radius threshold and less than the configurable turning radii threshold, the second turning radius comprises the configurable inner turning radius and the first turning radius is determined based on the lateral distance, the longitudinal distance, and the second turning radius; or if the longitudinal distance is greater than or equal to the configurable turning radii threshold, the first turning radius comprises the configurable outer turning radius and the second turning radius comprises the configurable inner turning radius.

Example 21. The method of Example 20, wherein the method further comprises: if the longitudinal distance is greater than or equal to the configurable turning radii threshold, controlling, using the assisted-driving or the autonomous-driving system, the host vehicle to drive a straight distance before performing the two-turn maneuver, the straight distance being approximately equal to the longitudinal distance minus the configurable turning radii threshold.

Example 22. The method of Example 20, whether the method further comprises: determining whether the longitudinal distance is greater than the minimum turning radii threshold and the lateral distance is greater than the minimum inner turning radius but less than the configurable inner turning radius; and responsive to determining that the lateral distance is greater than the minimum inner turning radius but less than the configurable inner turning radius and: responsive to determining that the longitudinal distance is greater than the minimum turning radii threshold and less than the configurable inner turning radius threshold, setting the first turning radius as the minimum outer turning radius and determining the second turning radius based on the lateral distance, the longitudinal distance, and the first turning radius; responsive to determining that the longitudinal distance is greater than the configurable inner turning radius threshold and less than the configurable turning radii threshold, setting the second turning radius as the configurable inner turning radius and determining the first turning radius based on the lateral distance, the longitudinal distance, and the second turning radius; or responsive to determining that the longitudinal distance is greater than or equal to the configurable turning radii threshold, setting the first turning radius as the configurable outer turning radius and the second turning radius as the configurable inner turning radius.

Example 23. The method of Example 22, wherein the method further comprises: responsive to determining that the longitudinal distance is greater than or equal to the configurable turning radii threshold, controlling, using the assisted-driving or the autonomous-driving system, the host vehicle to drive a straight distance before performing the two-turn maneuver, the straight distance being approximately equal to the longitudinal distance minus the configurable turning radii threshold.

Example 24. The method of any one of Examples 15 through 23, wherein identifying the selected parking space among the one or more available parking spaces in front of the host vehicle comprises: determining, using the sensor data, whether multiple parking spaces are available in front of the host vehicle; determining, using the sensor data, parking-space characteristics of each available parking space of the multiple parking spaces, the parking-space characteristics including a width, an entry turning radius, and a distance to the available parking space; and determining the selected parking space among the multiple parking spaces based on the parking-space characteristics.

Example 25. The method of any one of Examples 15 through 24, wherein identifying the selected parking space among the one or more available parking spaces in front of the host vehicle comprises receiving a selection of the selected parking space from a driver of the host vehicle.

Example 26. The method of any one of Examples 15 through 25, wherein the configurable inner turning radius is pre-determined by a driver of the host vehicle.

Example 27. The method of any one of Examples 15 through 26, wherein the single-turn maneuver or the two-turn maneuver comprises a front-in parking maneuver.

Example 28. The method of any one of Examples 15 through 27, wherein the single-turn maneuver or the two-turn maneuver comprises a back-in parking maneuver, the back-in parking maneuver approximately mirroring a front-in parking maneuver for a parking space opposite the selected parking space.

Example 29. A system comprising one or more processors configured to perform the method of any one of Examples 15 through 28.

Example 30. A computer-readable storage media comprising computer-executable instructions that, when executed, cause a processor to perform the method of any one of Examples 15 through 28.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A method of controlling a host vehicle to park in a selected parking space, the method comprising:
   determining, using sensor data obtained from one or more sensors of the host vehicle, whether multiple parking spaces are available in front of the host vehicle;
   determining, using the sensor data, parking-space characteristics of each available parking space of the multiple parking spaces, the parking-space characteristics including a width, an entry turning radius, and a longitudinal distance to the available parking space;
   determining, using an application of Bayesian theorem to conditional probability distributions for the parking-space characteristics, the selected parking space among the multiple parking spaces based on the parking-space characteristics, each conditional probability distribution identifying how probable a respective available space is likely to be chosen as the selected parking space given a respective parking-space characteristic, each conditional probability distribution for each parking-space characteristic having a respective predetermined mean value and a respective predetermined variance value, the selected parking space being the respective available space with a highest probability value; and
   controlling, using an assisted-driving or autonomous-driving system, operation of the host vehicle to park in the selected parking space.

2. The method of claim 1, wherein the one or more sensors include at least one of radar systems, lidar systems, ultrasonic systems, or vision-based systems.

3. The method of claim 1, wherein determining whether multiple parking spaces are available in front of the host vehicle is also based on data obtained from external sensors, the external sensors including at least one of infrastructure sensors, drone-based sensors, or sensors installed on other vehicles near the host vehicle.

4. The method of claim 1, wherein the parking-space characteristics include at least one of a space depth, space type, neighboring vehicle classification, or shading classification, wherein the shading classification identifies whether any shade is currently available or is expected to be available during an expected parking duration.

5. The method of claim 4, wherein at least one of the parking-space characteristics are configurable based on driver preferences for the selected parking space.

6. The method of claim 1, wherein the selected parking space is determined using a machine-learned model, a reinforced learning model, or a deep learning model that is configured to receive the sensor data as input to infer the parking-space characteristics used to determine the selected parking space.

7. The method of claim 1, wherein the multiple parking spaces are approximately perpendicular or at an angle to a travel path of the host vehicle.

8. The method of claim 1, wherein the multiple parking spaces are approximately parallel to the travel path of the host vehicle.

9. The method of claim 1, wherein controlling the host vehicle to park in the selected parking space comprises performing a front-in parking maneuver.

10. The method of claim 9, wherein the front-in parking maneuver includes a two-turn maneuver path.

11. The method of claim 1, wherein controlling the host vehicle to park in the selected parking space comprises:
performing a two-turn front-in maneuver; and
performing a back-in parking maneuver after performing the two-turn front-in maneuver.

12. A system comprising:
one or more processors configured to control a host vehicle to park in a selected parking space by:
determining, using sensor data obtained from one or more sensors of the host vehicle, whether multiple parking spaces are available in front of the host vehicle;
determining, using the sensor data, parking-space characteristics of each available parking space of the multiple parking spaces, the parking-space characteristics including a width, an entry turning radius, and a longitudinal distance to the available parking space;
determining, using an application of Bayesian theorem to conditional probability distributions for the parking-space characteristics, the selected parking space among the multiple parking spaces based on the parking-space characteristics, each conditional probability distribution identifying how probable a respective available space is likely to be chosen as the selected parking space given a respective parking-space characteristic, each conditional probability distribution for each parking-space characteristic having a respective predetermined mean value and a respective predetermined variance value, the selected parking space being the respective available space with a highest probability value; and
controlling, using an assisted-driving or autonomous-driving system, the host vehicle to park in the selected parking space.

13. The system of claim 12, wherein the one or more sensors include at least one of radar systems, lidar systems, ultrasonic systems, or vision-based systems.

14. The system of claim 12, wherein the one or more processors are further configured to determine whether multiple parking spaces are available in front of the host vehicle based further on data obtained from external sensors, the external sensors including at least one of infrastructure sensors, drone-based sensors, or sensors installed on other vehicles near the host vehicle.

15. The system of claim 12, wherein the parking-space characteristics include at least one of a space depth, space type, neighboring vehicle classification, or shading classification.

16. The system of claim 13, wherein at least one of the parking-space characteristics are configurable based on driver preferences for the selected parking space.

17. The method of claim 1, wherein the controlling, operation of the host vehicle to park in the selected parking space comprises:
determining, using the sensor data, a lateral distance and the longitudinal distance associated with the selected parking space, the lateral distance indicating a distance between another vehicle in an adjacent parking space and the host vehicle in a lateral direction from the host vehicle, the longitudinal distance indicating a distance between the selected parking space and the host vehicle;
determining whether the lateral distance and the longitudinal distance are greater than a minimum inner turning radius of the host vehicle; and
responsive to determining that the lateral distance and the longitudinal distance are greater than the minimum inner turning radius, controlling, using the assisted-driving or the autonomous-driving system, the host vehicle to park in the selected parking space using a single-turn maneuver; or
responsive to determining that the lateral distance is not greater than the minimum inner turning radius:
determining whether the longitudinal distance is greater than a longitudinal threshold, the longitudinal threshold being based on the minimum inner turning radius or a configurable inner turning radius of the host vehicle, the configurable inner turning radius being greater than the minimum inner turning radius; and
responsive to determining that the longitudinal distance is greater than the longitudinal threshold, controlling, using the assisted-driving or the autonomous-driving system, the host vehicle to park in the selected parking space using a two-turn maneuver.

* * * * *